United States Patent
Mikami

(10) Patent No.: US 7,356,657 B2
(45) Date of Patent: Apr. 8, 2008

(54) SYSTEM AND METHOD FOR CONTROLLING STORAGE DEVICES

(75) Inventor: Shogo Mikami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 11/283,880

(22) Filed: Nov. 22, 2005

(65) Prior Publication Data

US 2007/0067586 A1    Mar. 22, 2007

(30) Foreign Application Priority Data

Sep. 16, 2005    (JP)    ............................. 2005-269573

(51) Int. Cl.
*G06F 13/10*    (2006.01)
(52) U.S. Cl. ..................................... 711/161
(58) Field of Classification Search ................ 711/112, 711/161, 162
See application file for complete search history.

(56) References Cited

U.S. PATENT DOCUMENTS

2004/0107226 A1*    6/2004    Autrey et al. ............... 707/204

FOREIGN PATENT DOCUMENTS

JP    2005-018738    1/2005

\* cited by examiner

*Primary Examiner*—Kevin L. Ellis
(74) *Attorney, Agent, or Firm*—Antonelli, Terry, Stout & Kraus, LLP.

(57) ABSTRACT

The present invention is constituted so as to enable more effective backup and restoration than in the prior art.

Each time a write request is issued from an application 47, a PVOL is updated by writing the data contained in the issued write request to the PVOL 43P. In the snapshot mode, when the write frequency exceeds a frequency threshold value, the mode is switched from the snapshot mode to the journal mode. When in the snapshot mode, a snapshot of the PVOL at this point in time is acquired, either at regular or irregular intervals, for a SVOL 43S, and the snapshot in this SVOL becomes the restoration data. When in the journal mode, a journal comprising the data in a write request is written to a JVOL 43J each time the write request is issued, and a backup, to which is applied the data in a journal written to the JVOL, is acquired when executing restoration.

14 Claims, 13 Drawing Sheets

FIG. 2A

51   VOLUME MANAGEMENT TABLE

| BACKUP OBJECT | MOUNT POINT | VOLUME ID |
|---|---|---|
| APPLICATION A | E:¥ | 001 |
| | F:¥ | 002 |
| APPLICATION B | G:¥ | 010 |

FIG. 2B

53   BACKUP SETTING TABLE

| BACKUP OBJECT | BACKUP SCHEDULE | ALLOWABLE ACCESS FREQUENCY | ALLOWABLE BACKUP TIME | BACKUP MODE |
|---|---|---|---|---|
| APPLICATION A | 02:00 DAILY | 100MB/S | 30min | JOURNAL BACKUP |
| APPLICATION B | 03:00 DAILY | 80MB/S | 25min | SNAPSHOT BACKUP |
| | 15:00 DAILY | 80MB/S | 25min | SNAPSHOT BACKUP |

FIG. 2C

55   BACKUP MANAGEMENT TABLE

| BACKUP OBJECT | BACKUP START TIME | BACKUP END TIME | RESTORATION VOLUME ID | JOURNAL APPLICATION VOLUME ID | JOURNAL VOLUME ID |
|---|---|---|---|---|---|
| APPLICATION A | 2005/07/05 02:00 | 2005/07/05 02:20 | 101, 102 | 111, 112 | 200 |
| APPLICATION B | 2005/07/05 03:00 | 2005/07/05 03:10 | 110 | - | - |
| | 2005/07/05 15:00 | 2005/07/05 15:15 | 111 | - | - |

FIG. 2D

57   JOURNAL MANAGEMENT TABLE

| BACKUP OBJECT | JOURNAL SECURED AT ERROR DETECTION | JOURNAL RETENTION TIME | JOURNAL APPLICATION VOLUME ID | JJOURNAL VOLUME ID | JOURNAL SECURED TIME |
|---|---|---|---|---|---|
| APPLICATION A | NO | - | - | - | - |
| APPLICATION B | YES | ONE HOUR PRIOR TO ERROR | 121 | 201, 202 | 2005/07/04 18:32 |

FIG. 3A

59 ACCESS FREQUENCY LOG TABLE

| MEASUREMENT TIME | ACCESS FREQUENCY | | |
|---|---|---|---|
| | APPLICATION A | | APPLICATION B |
| | VOLUME ID : 001 | VOLUME ID : 002 | VOLUME ID : 010 |
| 10 : 00 | 100MB/S | 100MB/S | 10MB/S |
| 10 : 05 | 90MB/S | 95MB/S | 20MB/S |
| 10 : 10 | 80MB/S | 80MB/S | 20MB/S |
| 10 : 15 | 85MB/S | 80MB/S | 30MB/S |
| 10 : 20 | 80MB/S | 85MB/S | 40MB/S |

FIG. 3B

61 JOURNAL VOLUME MANAGEMENT TABLE

| VOLUME ID | VOLUME CAPACITY | ALLOCATION STATUS | TARGET APPLICATION |
|---|---|---|---|
| 0200 | 1.5GB | ALLOCATED | APPLICATION A |
| 0201 | 1.5GB | ALLOCATED | APPLICATION B |
| 0202 | 1.5GB | ALLOCATED | APPLICATION B |
| 0203 | 1.5GB | NOT ALLOCATED | – |
| 0204 | 2.0GB | NOT ALLOCATED | – |
| 0205 | 2.0GB | NOT ALLOCATED | – |

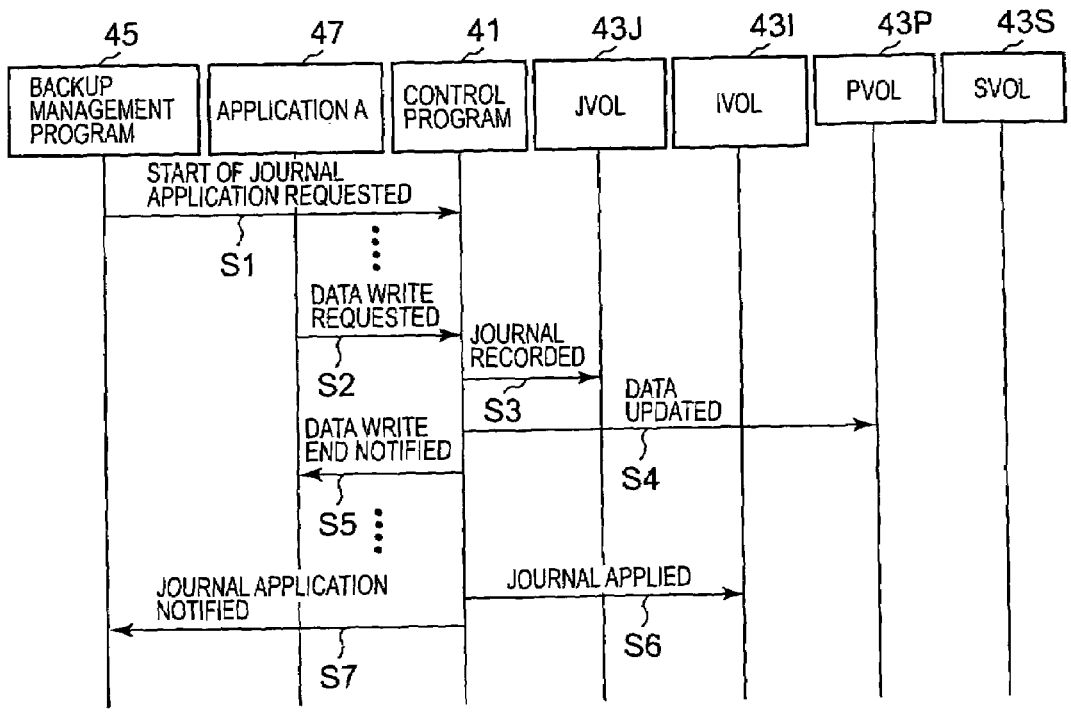
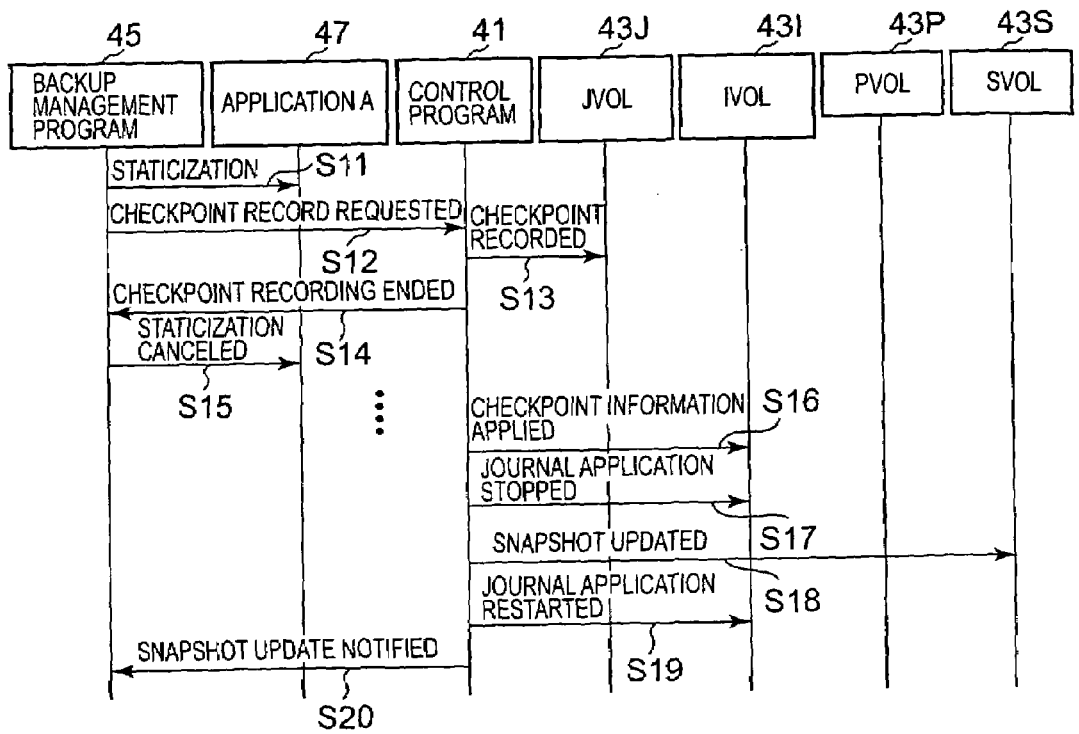

SYSTEM AND METHOD FOR CONTROLLING STORAGE DEVICES

BACKGROUND OF THE INVENTION

1. Field of the Invention

The present invention relates to data storage technology, and more particularly to controlling the backup and restoration of data.

2. Description of the Related Art

For example, there is technology for restoring data of an arbitrary point in time by combining a snapshot of a logical volume with a history (hereinafter journal) of write operations to that logical volume (For example, Japanese Laid-open Patent No. 2005-18738)

SUMMARY OF THE INVENTION

As technology employed for the backup and restoration of data, for example, there is technology for acquiring a snapshot, and using this snapshot to restore data (hereinafter, for convenience sake called "snapshot technology"), and technology for acquiring a journal and using this journal to restore data (hereinafter, for convenience sake called "journal technology"). A snapshot is an image of a logical volume taken at a certain point in time. A journal is a history of write operations to a logical volume.

In accordance with snapshot technology, since the snapshot itself can generally be used as the restoration data, restoration can be carried out in a short period of time. However, because of the need to acquire a number of snapshots in order to be able to restore data from any of a large number of points in time, snapshot technology is load intensive.

By contrast, in accordance with journal technology, the load is small compared to that of snapshot technology since recording a journal of logical volume write operations can be used even when restoring data from any of a large number of points in time. However, to restore the data of a certain point in time in the past, the journals of each point in time up to that point must be used in sequence to restore this data, thus generally requiring a longer time for restoration than snapshot technology. Further, when the data targeted for restoration possesses associations between data as in applications or databases, the consistency of this restored data must be assured at the application and database levels, but data restored from at arbitrary point in time in a storage journal cannot necessarily guarantee the above-mentioned consistency.

Thus, snapshot technology and journal technology both have their shortcomings, and alone cannot always perform effective backup or restoration. Further, in order to compensate for their mutual shortcomings, methods for using snapshot technology and journal technology together at all times can also be considered, but always using these technologies in combination is problematic from the standpoints of load and cost.

An object of the present invention is to enable more effective backup and restoration than in the prior art.

Further objects of the present invention should become clear from the following explanation.

A storage control method according to the present invention is one, which is achieved by a system comprising a logical volume and an access request source for a logical volume. This storage control method executes the following processes:

(A) Updates a first logical volume by writing data contained in an issued write request to the above-mentioned first logical volume each time a write request is issued from the access request source;

(B) Transitions to the snapshot mode;

(C) Monitors the state related to securing the length of time for backup execution, and when it comes to a state where securing the length of time for backup is more difficult than a certain state due to a reduced backup window, which is the length of time during which it is possible for the access request source to be halted or staticized (For example, when the length of time required for backup is longer than the backup window), transitions to the journal mode in place of the above-mentioned snapshot mode;

(D) When in the above-mentioned snapshot mode, acquires, either at regular or irregular intervals, a snapshot of the above-mentioned first logical volume at the point in time at which backup is executed for a second logical volume, and takes the snapshot in the above-mentioned second logical volume as restoration data when restoration is executed; and (E) When in the above-mentioned journal mode, writes to a third logical volume a journal, which is a write log comprising the data in the above-mentioned write request, each time the above-mentioned write request is issued, and acquires a backup, which applies the data in the journal written to the above-mentioned third logical volume when executing restoration.

In a first aspect of the present invention, monitoring of the state related to securing the above-mentioned length of time for executing backup can take the form of determining the frequency at which write requests for the above-mentioned first logical volume is issued, and comparing the determined issuing frequency with a certain frequency threshold. In the case of the above-mentioned state, where securing the length of time for backup is more difficult than a certain state, this state can be taken as a case in which the above-mentioned issuing frequency exceeds the above-mentioned certain frequency threshold. Further, when the above-mentioned issuing frequency becomes less than the above-mentioned certain frequency threshold, it is also possible to transition to the original snapshot mode in place of the above-mentioned journal mode.

In a second aspect, monitoring of the state related to securing the above-mentioned length of time for executing backup can take the form of calculating the length of time for backup execution in accordance with a prescribed method (for example, from the time when backup starts and finishes, respectively), and comparing the calculated length of time for backup execution with a certain length-of-time threshold. In the case of the above-mentioned state, where securing the length of time for backup is more difficult than a certain state, this state can be taken as a case in which the calculated length of time for backup execution exceeds a prescribed length of time.

In a third aspect, when in the above-mentioned journal mode, the present invention acquires, at a predetermined timing, a snapshot of the above-mentioned first logical volume at this point in time for a fourth logical volume, and, either at regular or irregular intervals, acquires a post-update snapshot by applying the data in the journal in the above-mentioned third logical volume to the snapshot in the above-mentioned fourth logical volume, and generates the post-update snapshot in the above-mentioned second logical volume, and when executing restoration, can take the snapshot generated in the above-mentioned second logical volume as the restoration data. Further, when in the above-mentioned snapshot mode, the present invention staticizes the above-mentioned access request source so that a write request is not issued from the above-mentioned access request source, and subsequent to staticizing the above-mentioned access request source, can acquire a snapshot of the above-mentioned first logical volume for the above-mentioned second logical volume. When in the above-mentioned journal mode, it can acquire a snapshot of the above-mentioned first logical volume for the above-mentioned fourth logical volume without staticizing the above-mentioned access request source.

In a fourth aspect, when in the above-mentioned journal mode, the present invention writes in a prescribed storage area a checkpoint, which is data representing a point in time in at least one of the point in time of backup, or the point in time at which an error is detected, and when executing restoration, can acquire a backup which applies the data in the journal of up to the point in time represented by the above-mentioned checkpoint. Furthermore, when in this journal mode, it is possible to write a checkpoint after staticizing the access request source, and to unstaticize the access request source thereafter.

In a fifth aspect, when the storage control method constitutes at least one of the above-mentioned snapshot mode and the above-mentioned journal mode, it secures the journal in the above-mentioned third logical volume by effecting control such that the journal is not added to the above-mentioned third logical volume when an error is detected, and can acquire a backup in which data in a journal of up to a predetermined time prior to this point in time is applied.

In a sixth aspect, there can be at least a plurality of the second logical volume. In this case, a decision as to whether or not to secure a journal when an error is detected can be recorded in a table, which is different from the table for recording the second logical volume to which a backup, which applies the data in the above-mentioned journal, will be applied.

In a seventh aspect, the present invention can select a logical volume from among a plurality of logical volume candidates, and take this selected logical volume as the above-mentioned third logical volume. Here, either the capacity or number of the above-mentioned selected logical volume can be made either the capacity or number corresponding to the state related to securing the length of time for backup execution.

A computer, which accords with the present invention, is capable of executing the following processes:

(b) Issues a write request for a first logical volume to the storage system;

(c) Transitions to the snapshot mode;

(d) Monitors the state related to securing the length of time for backup execution, and when it comes to a state where securing the length of time for backup is more difficult than a certain state due to a reduced backup window, which is the length of time during which it is possible for the access request source to be halted or staticized, transitions to the journal mode in place of the above-mentioned snapshot mode;

(e) When in the above-mentioned snapshot mode, makes a request to the above-mentioned storage system so as to acquire, either at regular or irregular intervals, a snapshot of the above-mentioned first logical volume at the point in time at which backup is executed, and takes the snapshot in the above-mentioned second logical volume, which corresponds to the above-mentioned first logical volume, as restoration data when executing restoration; and (f) When in the above-mentioned journal mode, requests the above-mentioned storage system to commence recording a journal, which is a write log comprising the data in the above-mentioned write request. The respective processes (b) through (f) can either be executed using predetermined means, or can be executed by either reading in a plurality of computer programs, or by using a plurality of processors (for example, CPUs). Each computer program can be read in from a storage resource (for example, a memory) provided in the computer. A computer program can either be installed on this storage resource via a CD-ROM or other such storage medium, or it can be downloaded to this storage resource via the Internet or some other such communications network.

In accordance with the present invention, it is possible to carry out backup and restoration more effectively than in the prior art.

BRIEF DESCRIPTION OF THE DRAWINGS

FIG. 2A shows an example of the constitution of a volume management table, FIG. 2B shows an example of the constitution of a backup setting table, FIG. 2C shows an example of the constitution of a backup management table, and FIG. 2D shows an example of the constitution of a journal management table;

FIG. 3A shows an example of the constitution of an access frequency log table, and FIG. 3B shows an example of the constitution of a journal volume management table;

FIG. 9A shows an example of the flow of processing from an application 47-based data write up to journal application for an IVOL43I, and FIG. 9B shows an example of the flow of processing performed for acquiring a snapshot when the backup mode is "journal backup";

DESCRIPTION OF THE PREFERRED EMBODIMENT

Figure 1A:
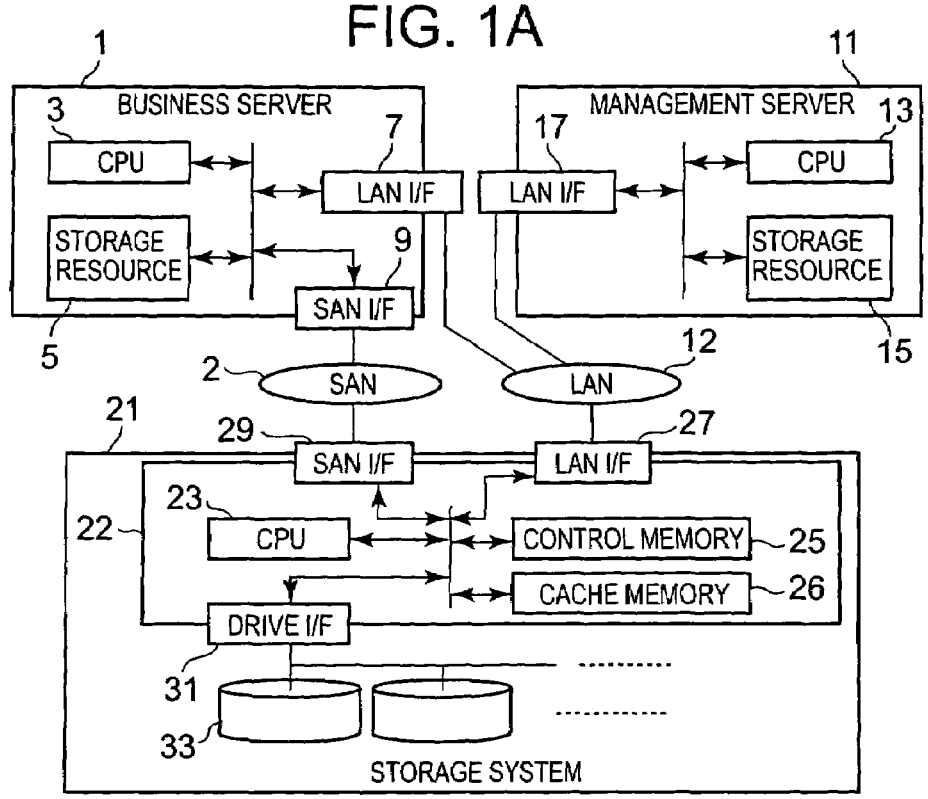
FIG. 1A shows an overview of a system hardware configuration related to a first embodiment of the present invention.

FIG. 1A shows an outline of the hardware configuration of a system related to a first embodiment of the present invention.

A business server 1, a storage system 21, and a management server 11 are connected to a first communications network, for example a LAN (Local Area Network) 12. The business server 1 and storage system 21 are connected to a second communications network, for example a SAN (Storage Area Network) 2. Furthermore, the first and second communications networks can be a single communications network. Further, the business server 1 and storage system 21 can also comprise a plurality of units, but in order to make the explanation easy to understand, only one unit each is shown in the figure.

The business server 1 is a server for executing a job of a user (hereinafter, a user job). The business server 1 is a computer machine, comprising storage resources (for example, a memory and a hard disk drive) 5 capable of storing a variety of computer programs; a CPU 3 for reading and executing a computer program from a storage resource 5; an interface device (hereinafter, abbreviated as "I/F") 9 for controlling communications via the SAN 2; and hardware resources such as a LAN I/F 7 for controlling communications via the LAN 12.

The management server 11 is the server for monitoring and managing the storage system 21. The management server 11 is a computer machine, comprising a storage resource 15 capable of storing various computer programs; a CPU 13 for reading and executing a computer program from the storage resource 15; and hardware resources, such as a LAN I/F 17 for controlling communications via the LAN 12. Furthermore, in this embodiment, the management server 11 and business server 1 are separate servers, but the management server 11 and business server 1 can also be the same server. Further, an aspect whereby the functionality possessed by the management server 11 (for example, a function manifested by executing a storage management program 49, which will be explained below) is in the storage system 21 and does not exist in the management server 11, can also be employed.

The storage system 21, for example, can be a RAID (Redundant Array of Independent Inexpensive Disks) system, comprising a plurality of media drives (for example, hard disk drives) 33, which comprise storage media capable of storing data (for example, hard disks). In addition to a plurality of media drives 33, the storage system 21 also comprises, for example, a controller 22.

The controller 22 is a device for controlling the operation of the storage system 21. The controller 22 can comprise a SAN I/F 29 for controlling communications via the SAN 2; a LAN I/F 27 for controlling communications via the LAN 12; and a drive I/F 31 for controlling communications via the respective media drives 33. Further, the controller 22 can also comprise a cache memory 26 capable of temporarily storing data exchanged between a media drive 33 and the business server 1; a memory (hereinafter, control memory) 25 capable of storing data and a computer program for controlling the storage system 21; and a CPU 23 for reading and executing a computer program from the control memory 25.

Figure 1B:
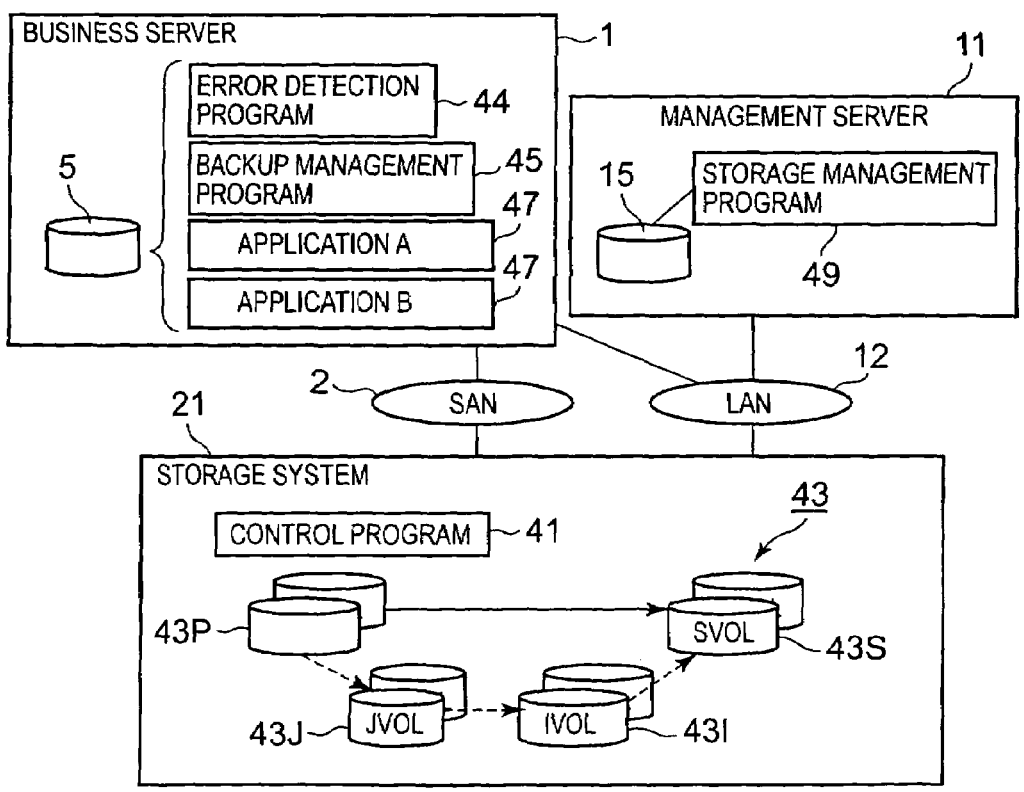
FIG. 1B shows an example of the computer programs, which are executed on the respective servers and storage system constituting a system related to the first embodiment of the present invention.

FIG. 1B shows an example of the computer programs, which are executed on the respective servers and storage system constituting a system related to the first embodiment of the present invention. Furthermore, for the sake of convenience, hereinbelow the subject of an operation carried out by a CPU, which reads and executes a computer program, will be given as "the program" rather than "the CPU".

The CPU 3 of the business server 1 can execute either one or a plurality of application programs (hereinafter, shortened to "application") 47, a backup management program 45, and an error detection program 44.

An application 47 is a program for performing a user job. This program 47 can read out and utilize data stored on a media drive 33 of the storage system 21. Furthermore, two applications A, B are given as examples in FIG. 1B, but in actuality, any number of applications can be run.

The backup management program 45 is capable of controlling a copy pair of a logical volume (a logical storage device established on a media drive 33) 43 in the storage system 21, staticizing an application 47, and backing up and restoring application 47 data (copy-pair control and staticization will be explained hereinbelow). Further, when the backup management program 45 utilizes the below-mentioned journal volume 43J at backup, it can record the point in time, at which the consistency of the target application 47 is ensured, as a checkpoint (for example, a flag) in the journal volume 43J. Further, this program 45 holds various tables, which will be explained hereinbelow.

The error detection program 44 is a program for detecting error information outputted as a result of executing an application program 47. When this program 44 detects error information (for example, immediately upon detecting error information), it can notify the backup management program 45 that an error has been detected.

The CPU 13 of the management server 11 can execute the storage management program 49. The storage management program 49 can monitor the operational status of the storage system 21. Further, the storage management program 49 can also regularly (or irregularly) acquire an access frequency for the respective logical volumes 43 in the storage system 21, and record an acquired access frequency in a prescribed table.

The CPU 23 of the storage system 21 can execute the control program 41. The control program 41 can process an access request from the business server 1 (for example, a data write or read request), and/or control copying between logical volumes 43. When the control program 41, for example, receives a write request from the business server 1, it can write the data contained in this write request to the logical volume 43 specified by this write request, and at substantially the same time, record the write log (that is, the journal) in the journal volume 43J. Further, the control program 41 can prepare a snapshot for a secondary volume 43S, which will be explained hereinbelow, by carrying out prescribed processing in accordance with a request from the backup management program 45.

A plurality of logical volumes 43 can be set in the storage system 21. This plurality of logical volumes 43, for example, comprises a primary volume (hereinafter, PVOL) 43P, a secondary volume (hereinafter, SVOL) 43S, a journal volume (hereinafter, JVOL) 43J, and a journal application volume 43I.

A PVOL 43P can store data utilized by an application 47, and is a logical volume, which constitutes a copy source. For example, when there is a write request from the business server 1, the data contained in this write request is written to a PVOL 43P by the control of the control program 41.

An SVOL 43S is a logical volume, which constitutes the copy destination of a PVOL 43P, or, in other words, is a logical volume, which is capable of storing a snapshot image of a PVOL 43P. An SVOL 43S can become a copy-pair with a PVOL 43P, and can hold as backup data a snapshot image of the point in time at which the copy-pair splits in accordance with a request from the backup management program 45.

A JVOL 43J is a logical volume capable of storing a log (journal) of write operations to a PVOL 43P. If a journal is recorded in a JVOL 43J, a restoration, which makes use of the journal, is possible. Furthermore, a separate snapshot, which becomes the point of origin of a journal, is necessary in order to restore data using a journal.

A journal application volume 43I is a logical volume capable of storing a snapshot for applying a journal recorded in a JVOL 43J. This volume 43I is used internally for creating a snapshot for a restoration on an SVOL 43S. Thus, for the sake of convenience, journal application volume will be abbreviated as "IVOL" hereinbelow.

Incidentally, in this embodiment, the backup management program 45 can hold a volume management table, backup setting table, backup management table and journal management table on a storage resource 5. Further, the storage management program 49 can hold an access frequency log table, and journal volume management table on a storage resource 15. The respective tables will be explained hereinbelow.

FIG. 2A shows an example of the constitution of a volume management table.

A volume management table 51 is used to enable the backup management program 45 to determine the correspondence between a backup-targeted application and a volume. More specifically, for example, the volume management table 51 registers the "backup object", "mount point" and "volume ID" of each application 47 that exists in the same business server 1 as the backup management program 45. A "backup object" is the ID (for example, the name) of an application 47, which will utilize data targeted for backup. A "mount point" is the path name of a virtual drive recognized by an application 47, and a "volume ID" is the ID (for example, the number) of a logical volume 43 (typically, a PVOL 43P), which has been allocated to this drive.

FIG. 2B shows an example of the constitution of a backup setting table.

A backup setting table 53 is a table for recording information related to setting up a user-defined backup. More specifically, for example, a "backup object", "backup schedule", "allowable access frequency", "allowable backup time", and "backup mode" are registered in the backup setting table 53 for each application 47 that exists in the same business server 1 as the backup management program 45. "Backup object" has the same meaning as the "backup object" registered in the volume management table 51. A "backup schedule" represents the timing at which a backup will be executed. (For example, if the backup schedule is "02:00 daily", backup will be executed everyday at 02:00.) An "allowable access frequency" is the maximum value of the access frequency at which a backup is allowed in the normal state. (This will be explained below.) An "allowable backup time" is the maximum value of the length of time required for a backup, during which a backup is allowed in the normal state. A "backup mode" denotes which method will be used to carry out a backup, and in this embodiment, there are two types of backup modes, a "snapshot backup", which acquires a snapshot as a backup, and a "journal backup", which records a journal.

FIG. 2C shows an example of the constitution of a backup management table.

A backup management able 55 is for recording the processing state of a backup executed by the backup management program 45. More specifically, for example, a "backup object", "backup start time", "backup end time", "restoration volume ID", "journal application volume ID" and "journal volume ID" are registered in the backup management table 55 for each application 47 that exists in the same business server 1 as the backup management program 45. "Backup object" is defined the same as the "backup objects" described hereinabove. A "backup start time" is the time at which the execution of a backup commenced, and a "backup end time" is the time at which the execution of this backup finished. A "restoration volume ID" is the ID of the SVOL 43S in which a snapshot was created, a "journal application volume ID" is the ID of the IVOL 43I utilized at backup, and a "journal volume ID" is the ID of the JVOL 43J, which constituted the journal recording destination at backup.

FIG. 2D shows an example of the constitution of a journal management table.

A journal management table 57 is user-defined information, and is a table for recording information related to the setup for a journal restoration (a restoration utilizing a journal), and information related to the processing state of a backup. More specifically, for example, a "backup object", "journal secured at error generation", "journal retention time", "journal application volume ID", "journal volume ID" and "journal secured time" are registered in the journal management table 57 for each application 47 that exists in the same business server 1 as the backup management program 45. "Backup object" is defined the same as the "backup objects" described hereinabove. When error information is detected by the error detection program 44, "journal secured at error detection" denotes whether or not a journal will be secured with regard to a write by the application 47, which outputted this error information. If a journal is not to be secured, then the respective information of the "journal retention time", "journal application volume ID", "journal volume ID" and "journal secured time" is not registered. "Journal retention time" signifies the point in time up to which a journal is to be saved. For example, if the journal retention time is "one hour prior to error generation", this signifies that a journal up to one hour prior to the point in time at which error information is detected is to be saved, and the rest deleted. A "journal application volume ID" and "journal volume ID" are defined the same as above. A "journal secured time" is the time at which the securing of a journal was carried out.

FIG. 3A shows an example of the constitution of an access frequency log table.

An access frequency log table 59 is for recording the access frequency of a logical volume 43 utilized by an application 47 targeted for backup. More specifically, for example, "measurement time" and "access frequency" are registered in the access frequency log table 59. A "measurement time" is the time at which the access frequency was acquired. "Access frequency" is the access frequency of each logical volume 43 used by the respective applications 47.

Furthermore, "access frequency" here can be taken as the size of data written per unit of time. For example, the control program 41 can write in a prescribed storage area an update log of a PVOL 43P for each application 47. (For example, how many megabytes of data were written from what time, and how long it took to do so.) The storage management program 49 can issue a prescribed request to the control program 41 at regular intervals. The control program 41 can send to the storage management program 49 an update log of up to a predetermined time prior to the point in time at which this request was received. The storage management program 49, based on the respective update logs received, can determine an access frequency like that of FIG. 3A by dividing the total size of the data, which was written from the time of the request issued immediately prior (measurement time) to the current measurement time, by the length of time (for example, in "seconds") from the immediately prior measurement time to the current measurement time.

Of course, the above-mentioned access frequency is only one example. For example, "access frequency" can also signify how many write requests were issued per unit of time.

FIG. 3B shows an example of the constitution of a journal volume management table.

A journal volume management table 61 is for managing which user-defined JVOL 43J candidate is allocated to which application (In other words, which candidate is actually being utilized as a JVOL 43J). More specifically, for example, a "volume ID", "volume capacity", "allocation status", and "target application" are registered in the journal volume management table 61 for each JVOL 43J. "Volume ID" denotes the ID of a JVOL 43J. "Volume capacity" denotes the storage capacity of a JVOL 43J. "Allocation status" denotes whether or not a JVOL 43J has been allocated. "Target application" denotes the ID of an application 47 to which a JVOL 43J has been allocated.

The preceding has been an explanation of the respective tables.

Figure 4:
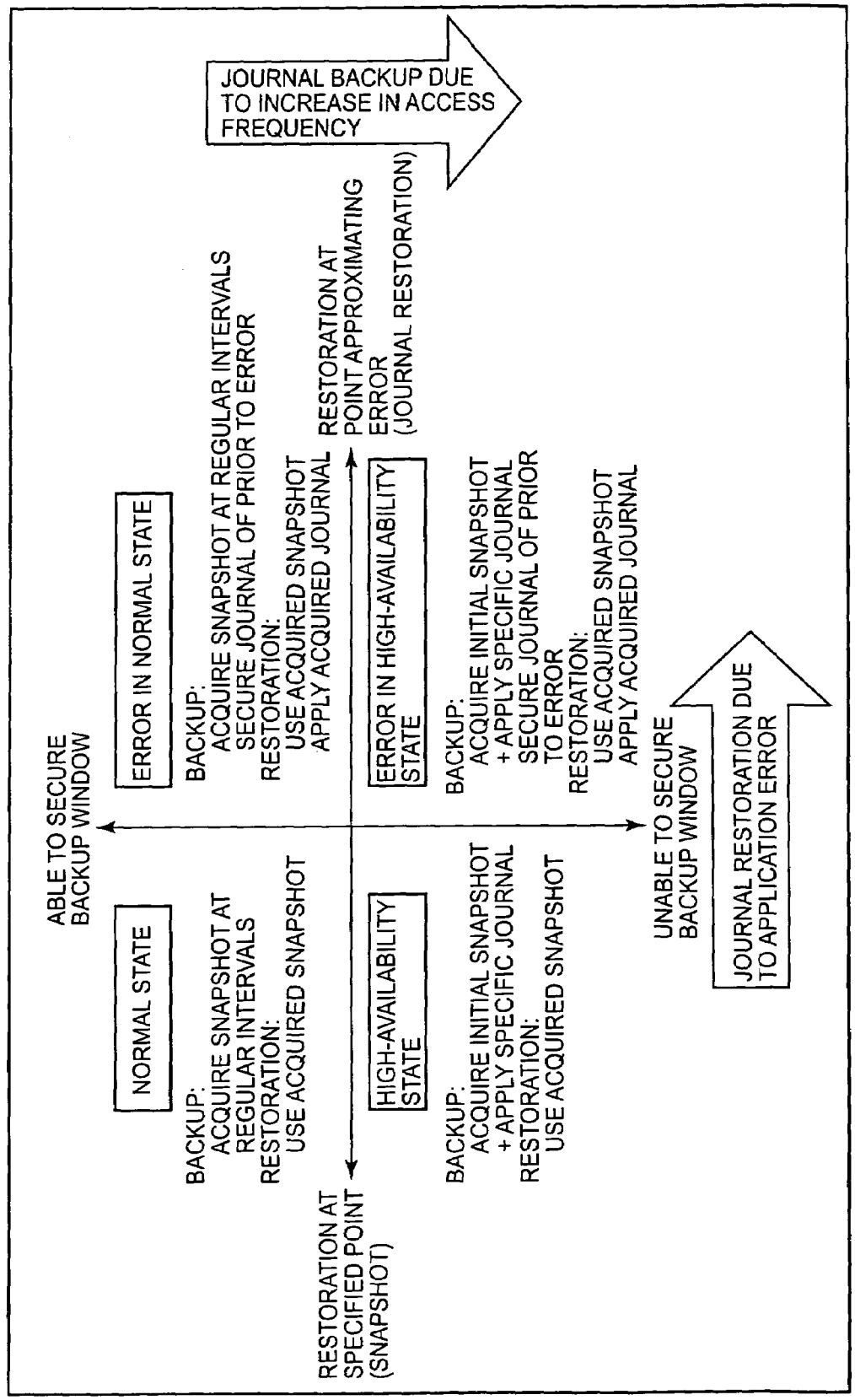
FIG. 4 is a schematic diagram outlining the essential parts of the first embodiment of the present invention.

An outline of the essential elements of this embodiment will be explained below by referring to FIG. 4.

In this embodiment, the backup management program 45 basically carries out a backup by regularly (or irregularly) generating a snapshot in an SVOL 43S. This state is called the "normal state" in this embodiment. In the normal state, restoration is executed using a snapshot.

In the normal state, when the access frequency rises as a result of an application 47, it becomes difficult to secure a backup window for acquiring a snapshot, and as a result, securing the length of time for backup becomes difficult. Here, "backup window" as used in this embodiment signifies the length of time during which it is possible to halt or staticize an access request source (in this embodiment, an application) for acquiring a backup. It is desirable that data not be altered during this data backup execution. Thus, during backup execution, it is desirable to prevent at least the data from being updated by the application 47, and by so doing, the backup window constitutes a length of time during which access by an application 47 is not possible. However, when access frequency increases, job throughput decreases when access is halted.

Accordingly, in this embodiment, when access frequency increases in the normal state, the backup management program 45 switches from snapshot-based backup to journal-based backup in order to ensure the availability of the application 47. Furthermore, the backup management program 45, in the background, applies a journal of up to a checkpoint (a point in time at which the consistency of a target application 47 is assured) to a snapshot. Thus, at the point in time of the above-mentioned switchover, restoration can be carried out via a snapshot the same as in the normal state.

Conversely, in the normal state, when error information is generated in an application 47 for some reason or another (for example, the destruction of logical data), and this error is detected, the backup management program 45 can secure a journal of a predetermined period of time prior to the generation of the error information. Further, at this time, the backup management program 45 records a checkpoint of point in time at which the consistency of the data at the application (and/or database) level (in the explanation of this embodiment, it will be referred to simply as "application consistency") of a group of secured journals is assured. The checkpoint can also be recorded at the point in time at which application consistency is clearly assured by a backup operation for a user backup management program 45. Further, the checkpoint can also be recorded by the control program 41 in accordance with an application 47 detecting, and notifying the storage system 21, either at regular or irregular intervals, of the point in time at which data consistency was assured.

Furthermore, the reason the backup management program 45 secures a journal when application 47 error information is generated, for example, is as follows. That is, the destruction of logical information, which occurs in an application 47, is localized, and when the storage system 21 can continue to operate even after this data destruction occurs, a time lag can occur until the data destruction is detected as an actual error. When there is a time lag between error generation and error detection, at the point in time that the error is detected, a user is not able to specify the time at which the error occurred, in other words, the exact point at which data restoration should be carried out. In this case, the user must perform restoration work using a journal in order to carry out restoration while tracing time back to the point of origin of the error, and specifying the point at which restoration should be conducted. To do away with this kind of inefficiency, the recording of a checkpoint as described hereinabove is carried out. In this case, restoration is performed by applying the journal between the recorded checkpoint and the nearest checkpoint thereto to the acquired snapshot. (This restoration will be explained below.)

The preceding has been an explanation summarizing the essential elements of this embodiment. That is, in FIG. 4, when the access frequency of an application 47 increases in the normal state, the state transitions to a high availability state. Further, when the generation of application 47 error information is detected in the normal state, the state transitions from the normal state to a normal state at error generation. Furthermore, in FIG. 4, the high availability state at error generation is the state transitioned to when the generation of application 47 error information is detected in the high availability state. When in this state, both the assurance of application 47 availability and journal-based restoration become possible, but the utilization capacity of the JVOL 43J (in other words, the frequency of accesses to the JVOL 43J) becomes the largest.

The flow of processing carried out via this embodiment will be explained in detail below, but before that, the prerequisites for this processing flow will be described.

Firstly, the backup management program 45 holds a volume management table 51 (refer to FIG. 2A), which denotes the relationship between an application 47, which is running on the same business server 1, and a logical volume 43.

Secondly, the user independently defines the backup schedules of applications A and B for the backup management program 45, and the backup management program 45 holds these defined backup schedules in the "backup schedule" of the backup setting table 53 (Refer to FIG. 2B). Further, an "allowable access frequency" and "allowable backup time" are set in this same table 53 for each application 47 as threshold information for switching the backup mode from snapshot backup to journal backup.

Thirdly, an application B47 is a program for executing a highly critical job. Thus, the user sets up the backup management program 45 such that, in addition to normal backup, it can also carry out journal restoration (restoration using a journal) in a range of one hour prior to an error being generated in preparation for a situation in which logical data destruction occurs. Furthermore, this setup is recorded in the journal management table 57 (Refer to FIG. 2D).

Fourthly, the storage management program 49 acquires from the volume management table 51 the volume ID of the logical volume 43 being used by each application, and registers the acquired volume ID (that is, the ID of a logical volume to be monitored) in the access frequency log table 59 (Refer to FIG. 3A). Further, the user inputs information related to a logical volume 43, which constitutes a JVOL 43J candidate, to the storage management program 49, and the storage management program 49 registers the inputted information in the journal volume management table 61.

Fifthly, the control program 41 is constituted so as to be able to acquire a snapshot. A specific example will be explained below. Furthermore, when the control program 41 acquires a snapshot, terms such as "copy state", "synchronizing state" and "non-synchronizing state" will be used for the copy-pair state, and the meanings of these respective terms are as follows.

That is, a "copy state" is a state, wherein, in a process for a copy-pair to achieve a "synchronizing state", the difference between the data in a PVOL 43P and the data in an SVOL 43S (hereinafter, difference data) is copied to the SVOL 43S on the basis of a not-shown bitmap for managing the difference between the PVOL 43P and SVOL 43S (for example, a bitmap comprising the respective bits corresponding to the respective locations of the PVOL, hereinafter, difference bitmap). When there is no more difference data, the copy-pair state automatically transitions from the "copy state" to a "synchronizing state".

A "synchronizing state" is a state, wherein the data of a PVOL 43P and SVOL 43S is synchronized. In this state, when the data of the PVOL 43P is updated, this update (the data newly written to the PVOL 43P) is instantly (for example, substantially simultaneously to the PVOL 43P update) reflected in the SVOL 43S.

A "non-synchronizing state" is a state, wherein the data of a PVOL 43P and SVOL 43S is asynchronous, and a data update relative to the PVOL 43P does not affect the data of the SVOL 43S. (That is, even if new data is written to the PVOL 43P, this data is not written to the SVOL 43S.) When new data is written to the PVOL 43P, it is stored as difference data in a prescribed storage area, and the fact that the location to which the new data was written has been updated is recorded in the bitmap (For example, the bit corresponding to this location changes from a 0 to a 1).

To synchronize the data of a PVOL 43P and SVOL 43S, the control program 41 specifies, on the basis of the difference bitmap at the point in time when a snapshot acquisition command was received, the difference data required to copy from the PVOL 43P to the SVOL 43S, and then commences the synchronization process. Further, the control program 41 converts the copy-pair state to the "copy state" at the same time.

The control program 41 executes the copying of the specified difference data in bitmap units, and subsequent to copying the data, updates the pertinent places on the difference bitmap. (For example, when the copying of the difference data is complete, it changes the bit corresponding thereto from 1 to 0.) The control program 41 repeats this processing until there is no more difference data. At the point in time when the bitmap difference disappears, the copy-pair state automatically transitions to the "synchronizing state".

The control program 41, following the completion of difference data copying, changes the copy-pair state to the "non-synchronizing state" in order to create a snapshot (that is, in order to make sure the PVOL 43P update is not reflected in the SVOL 43S).

Thereafter, if the control program 41 receives a prescribed inquiry from the backup management program 45, it can return a completion report. In accordance with this series of processes, a snapshot of a PVOL 43P at the point in time when a snapshot acquisition command was received from the backup management program 45 can be generated in an SVOL 43S.

Sixthly, when data is written to a PVOL 43P, the control program 41 can record a journal in a journal volume 43J. This journal, for example, comprises the same data as the data written to the PVOL 43P, plus update information. "Update information" is information for managing data written to the PVOL 43P, and, for example, comprises information elements, such as the time at which a write request was received (and/or a number representing the order in which it was received), and the data size of the written data. In other words, the control program 41 is able to restore the data at the respective points in time at which this journal was written by reflecting the data in this journal in snapshots according to the order specified from the journal.

The flow of processing performed by this embodiment will be explained below.

Figure 5:
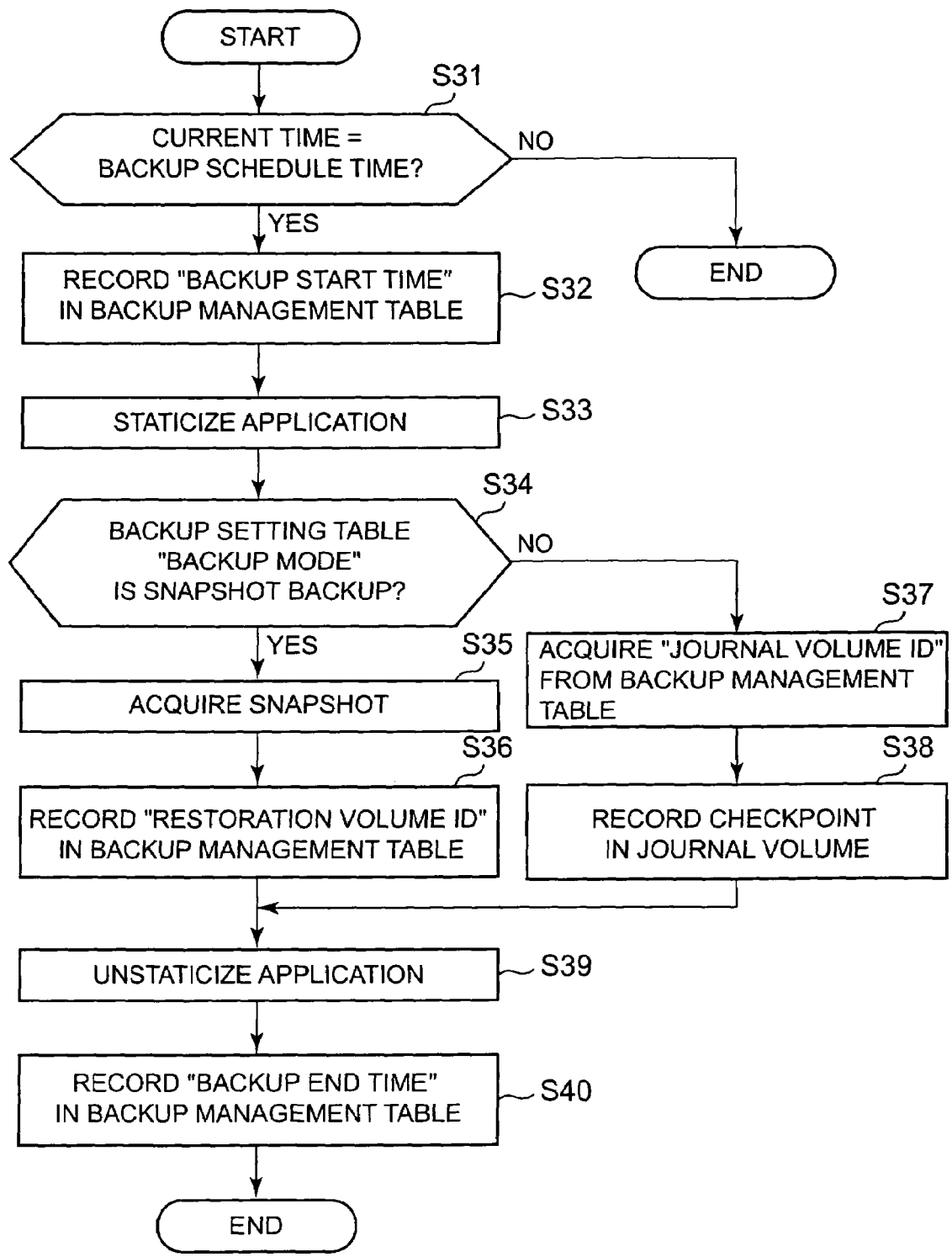
FIG. 5 shows an example of the flow of backup processing performed in a normal state.

FIG. 5 shows an example of the flow of backup processing carried out in the normal state.

If the "backup schedule" (the time set in the backup setting table 53) coincides with the current time (for example, the time acquired from a prescribed timer) (Step S31: YES), the backup management program 45 records the backup start time (that is, the current time here) in the "backup start time" column (the column in the backup management table 55) of the application 47 corresponding to this "backup schedule" (S32).

Next, the backup management program 45 staticizes the application 47 corresponding to this "backup schedule" (S33). The staticization of an application 47 is a process, which, in accordance with a method for issuing a prescribed command to this application 47, makes sure, at least, that this application 47 does not issue a write request. This process is performed to prevent data targeted for backup from being updated by a write request.

The backup management program 45 references the backup setting table 53, and determines a "backup mode" corresponding to the staticized application 47 (S34).

When, as a result of S34, it is determined that the "backup mode" will be "snapshot backup", (S34: YES), the backup management program 45 acquires a snapshot by sending a snapshot acquisition command to the control program 41 (S35).

When a completion report is received from the control program 41, the backup management program 45 can write the ID of the SVOL 43S in which the snapshot was generated to the backup management table 55 as the "restoration volume ID" (S36). Furthermore, the ID written here can be the ID, which was notified together with the completion report from the control program 41. The control program 41, for example, can maintain a table in which the correspondence between the respective PVOL 43P IDs and respective SVOL 43S IDs is written, and if the ID is written in this table, can notify the backup management program 45 of the ID of the SVOL 43S, which constituted the copy destination of the data at snapshot acquisition, together with the completion report.

Subsequent to S36, the backup management program 45 can cancel the staticization of the application 47 by issuing a prescribed command to the staticized application 47 (S39).

The backup management program 45 can record in the backup management table 55 the current time at the point in time at which S39 ends as the "backup end time" corresponding to the application 47 for which staticization was cancelled (S40). Furthermore, a plurality of "backup end times" regarding the same application 47 can be recorded as a log.

The above is one example of the flow of backup processing carried out in the normal state. Furthermore, when the "backup mode" determined in S34 is "journal backup", the backup management program 45 acquires from the backup management table 55 the "journal volume ID" corresponding to the staticized application 47 (S37), and requests the control program 41 to record a checkpoint for the latest journal in the JVOL 43J corresponding to this ID (S38). By so doing, a checkpoint, which signifies that the consistency of the data at the point in time this request was received is ensured, is recorded in the JVOL 43J by the control program 41.

Figure 6:
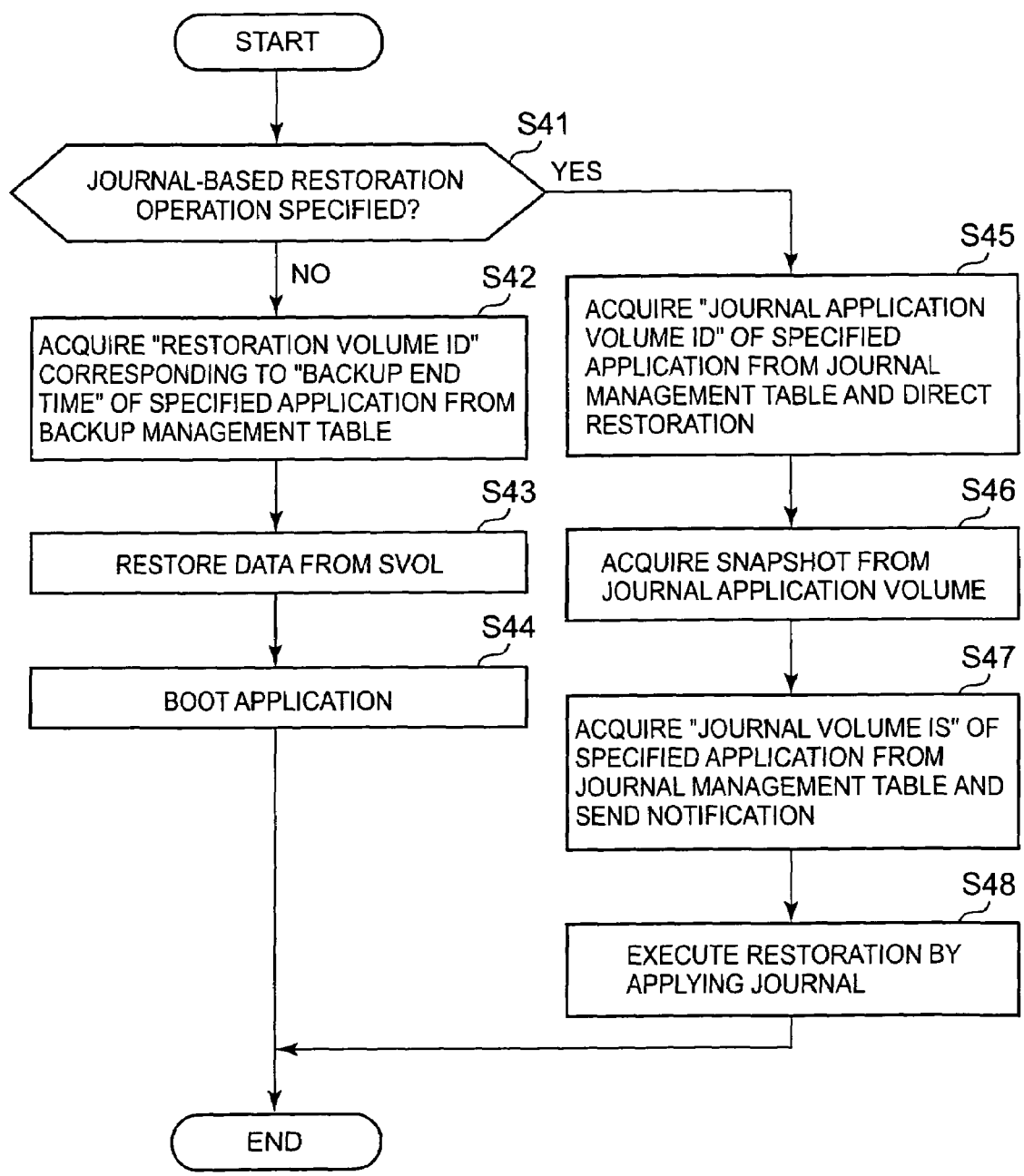
FIG. 6 shows an example of a restoration processing flow.

FIG. 6 shows an example of the flow of restoration processing.

The backup management program 45 can receive restoration instructions from a user (S41). More specifically, for example, the backup management program 45 can receive instructions as to whether restoration will be executed using a snapshot or a journal, and the specified application 47.

When the backup management program 45 receives a specification for snapshot-based restoration (S41: NO), it acquires from the backup management table 55 the "restoration volume ID" corresponding to the "backup end time" of the specified application 47 (S42). Next, the backup management program 45 restores data by reflecting the snapshot (that is, all the data) in the SVOL 43S corresponding to the acquired "restoration volume ID" into a PVOL 43P of the specified applications 47 (for example, restoration can be performed by taking this SVOL 43S as the PVOL 43P) (S43). Thereafter, the backup management program 45 can boot up this specified application 47.

Conversely, when the backup management program 45 receives a specification for journal-based restoration in S41 (S41: YES), it executes steps S45 through S48. These steps will be explained further below.

Figure 7:
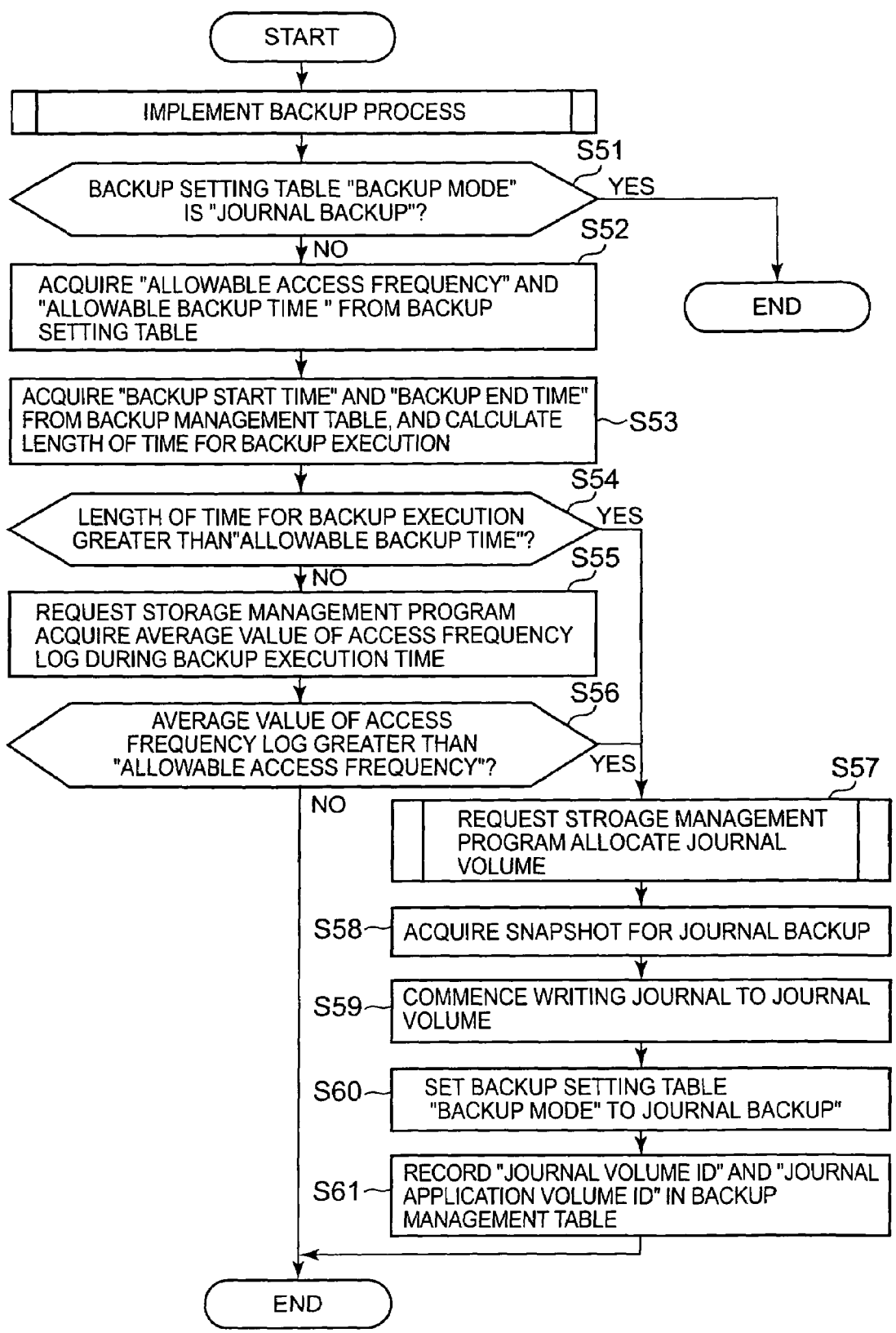
FIG. 7 shows an example of a processing flow performed when transitioning from the normal state to a high availability state.

FIG. 7 shows an example of the processing flow carried out when transitioning from the normal state to the high availability state.

When S40 of FIG. 5 is finished, the backup management program 45 references the backup setting table 53, and determines the "backup mode" of a certain application 47 (S51).

If the result of S51 is that the determined "backup mode" is "snapshot backup" (S51: NO), the backup management program 45 acquires from the backup setting table 53 the "allowable access frequency" and "allowable backup time" of this application 47 (S52). Then, the backup management program 45 acquires the "backup start time" and "backup end time" of this application 47 from the backup management table 55, and calculates the length of time for backup execution, which is the difference of these times (S53).

The backup management program 45 compares the length of time for backup execution with the "allowable backup time" (S54).

If the result of S54 is that the length of time for backup execution is less than the "allowable backup time" (S54: NO), the backup management program 45 acquires the average access frequency value during backup execution time by issuing a prescribed request to the storage management program 49 (for example, a request comprising the acquired "backup start time" and "backup end time") (S55). The backup management program 45 can calculate this average value by using the information received from the storage management program 49, or the storage management program 49 can calculate it. More specifically, for example, the storage management program 49 can calculate one or more average access frequency values measured between the "backup start time" and the "backup end time".

The backup management program 45 compares the acquired average access frequency value with the "allowable access frequency", and when the acquired average access frequency value is greater than the "allowable access frequency" (S56: NO), it terminates processing.

Figure 8:
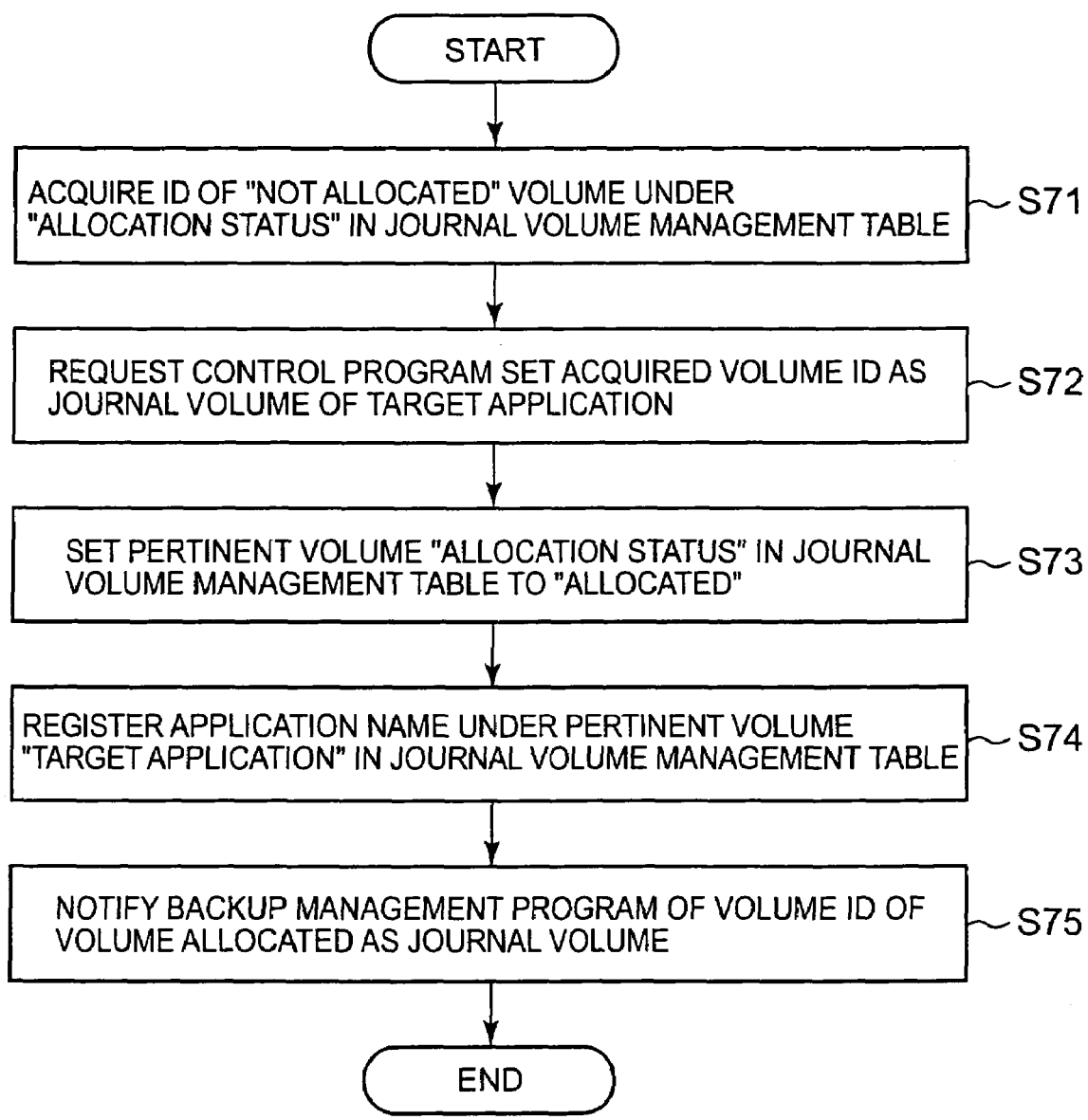
FIG. 8 shows an example of the flow of journal volume allocation processing.

When the length of time of backup execution is longer than the "allowable backup time" (S54: YES), or the acquired average access frequency value is greater than the "allowable access frequency" (S56: YES), the backup management program 45 requests the storage management program 49 to allocate a JVOL 43J (S57). In this case, the processing of FIG. 8 is performed.

In other words, the storage management program 49 acquires an "not allocated" "volume ID" on the journal volume management table 61 (S71), and requests the control program 41 to set this "volume ID" as a JVOL 43J for the application 47 that has become the target (S72). Then, the storage management program 49 updates the "volume ID" acquired in S71 to "allocated" (S73), and writes the application name in the "target application" column of the application 47 that has become the target (S74). Thereafter, the storage management program 49 can notify the backup management program 45 of the "volume ID" of the allocated journal volume (S75).

FIG. 7 will be referred to once again. The backup management program 45, which received the "volume ID" notification, can acquire a snapshot (hereinafter, initial snapshot) for applying a journal to the logical volume 43 that the application 47 will utilize (S58). Here, for example, the backup management program 45, by issuing a prescribed request, can have the control program 41 generate in an IVOL 43I a snapshot (that is, an initial snapshot) of a PVOL 43P at the point in time at which this request was received. It should be noted here that the processing of this S58 is executed without staticizing the application 47 as in S33 of FIG. 5.

The backup management program 45 instructs the control program 41 to write a journal in the allocated JVOL 43J (S59), and also sets the "backup mode" of the backup setting table 53 to "journal backup" (S60). Further, the backup management program 45 records the "journal volume ID" of the allocated JVOL 43J, and the "journal application volume ID" of the IVOL 43I utilized in the new snapshot for journal application, respectively, in the backup management table 55 (S61).

Furthermore, the reason for providing an IVOL 43I separately from an SVOL 43S here is because of the need to secure an SVOL 43S for the restoration data assured by the application staticization point, in preparation for a situation in which trouble occurs during journal application for preparing a snapshot.

In accordance with the above-mentioned state transition (or to put it another way, the backup mode switchover), it becomes possible to acquire a backup by simply recording a checkpoint for a JVOL 43J without the need to create a snapshot at backup time. Thus, it is possible to minimize (to substantially zero) the application staticization time required at backup acquisition.

After this, the control program 41, in the background (in other words, as processing, which is not recognized relative to an application 47, while receiving an access request from the application 47), successively applies the journal recorded in the JVOL 43J to the IVOL 43I, and also deletes the applied journal from the JVOL 43J (the applied journal can also be saved without being deleted). Furthermore, when the unused capacity of the JVOL 43J becomes insufficient at this time, the backup management program 45 can issue a request to the storage management program 49 to allocate an additional JVOL 43J. Or, when the unused capacity of the JVOL 43J is augmented, the backup management program 45 can issue a request to the storage management program 49 to cancel the allocation of a journal volume. In accordance with these requests, the storage management program 49 can either update a JVOL 43J candidate from "not allocated" to "allocated", or the other way around, from "allocated" to "not allocated". Further, the storage management program 49 can also issue a request to the control program 41 for a volume management update pursuant to this update.

An example of the flow of processing from an application 47-based data write to the application of a journal to an IVOL 43I will be explained hereinbelow by referring to FIG. 9A.

The backup management program 45 issues a journal application start request to the control program 41 (S1). This, for example, can be carried out at S60 of FIG. 7.

If, after receiving this request, the control program 41 receives a write request from an application 47 (S2), it writes a journal comprising the data in this write request to a JVOL 43J (S3), and writes this data to a PVOL 43P (S4). Furthermore, the control program 41, for example, can determine the logical volume 43 to which it should write the journal comprising the data of the application 47, which was the source of the write request, in accordance with the setting performed in response to the request of S72 of FIG. 8. Further, it can determine the logical volume 43 to which it should write the data of this application 47, for example, by referring to a not-shown table, in which is recorded the correspondence between the ID of a logical volume 43 and the ID of the application.

The control program 41 returns a data write end notification to the application 47, which was the source of the write request, when steps S3 and S4 are finished (S5).

Thereafter, at a prescribed timing, the control program 41 applies the journal (S6), and when this is complete, it sends a notification of the fact that journal application has been performed to the backup management program 45 (S7).

In the above-mentioned processing of FIG. 9A, the application 47-based data write and the application of a journal to the IVOL 43I are carried out asynchronously, but because these processes are controlled by the control program 41 on the storage system 21, the application of the journal can be guaranteed even when an error occurs in the business server 1.

Figure 13A:
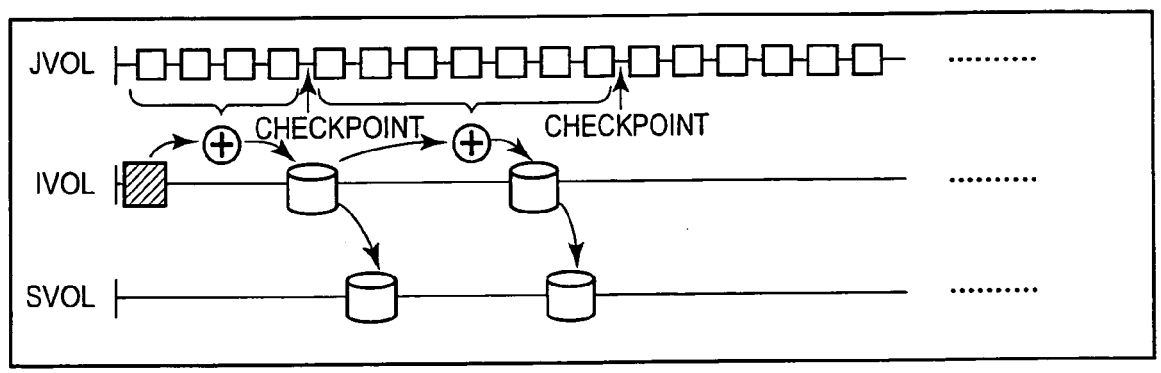
FIG. 13A is a diagram illustrating the application of a journal to an IVOL43I, and the copying of this journal from the IVOL43I to an SVOL43S.

FIG. 9B shows an example of the flow of processing carried out for acquiring a snapshot when the backup mode is "journal backup". Further, FIG. 13A is a diagram illustrating the application of a journal to an IVOL 43I, and the copying of this journal from the IVOL 43I to an SVOL 43S. In FIG. 13A, the block corresponding to the JVOL indicates a journal, and the block corresponding to the IVOL indicates an initial snapshot.

The backup management program 45 staticizes an application 47 (S11), and issues a checkpoint recording request to the control program 41 (S12). The control program 41 responds to this request, and records a checkpoint signifying that, of the group of journals in the JVOL 43J corresponding to the staticized application 47, consistency has been maintained for the journals up to the time this request was received (S13), and notifies the backup management program 45 that this recording is finished (S14). In response to receiving this notification, the backup management program 45 cancels the staticization of the application 47 (S15).

Thereafter, of the group of unapplied journals in the JVOL 43J corresponding to the unstaticized application 47, the control program 41, as shown in FIG. 13A, applies those journals up to the checkpoint-recorded journals to an IVOL 43I (S16). More specifically, for example, the control program 41 updates the snapshot in an IVOL 43I by writing to the IVOL 43I the data in the earlier journals of the group of journals to be applied. By so doing, the snapshot of subsequent to reflecting data in a journal of a certain point in time in a snapshot in the IVOL 43I constitutes the snapshot of a PVOL 43P of that point in time.

When S16 is complete, the control program 41 halts journal application once (S17), sets the IVOL 43I and SVOL 43S to the synchronizing state, and as shown in FIG. 13A, copies the snapshot in the IVOL 43I to the SVOL 43S (S18). When this copying is complete, after setting the IVOL 43I and the SVOL 43S to the non-synchronizing state, the control program 41 restarts journal application (S19), and notifies the backup management program 45 that snapshot updating is finished (S20). Furthermore, as for the restarting of journal application of S19, more specifically, the control program 41 restarts the processing (S6 and S7 of FIG. 9A) for applying the journal recorded in the JVOL 43J to the IVOL 43I. More specifically, in FIG. 9A, S2 through S5 are constantly being carried out in line with the execution of a job by an application 47, but the halting and restarting of S6 and S7 are carried out in accordance with S17 and S19.

In the above processing of FIG. 9B, the recording of a checkpoint at backup acquisition, and the updating of a snapshot on the SVOL 43S are carried out asynchronously. However, since the control program 41 on the storage system 21 controls these processes, snapshot updating can be guaranteed even when an error occurs in the business server 1.

Further, the processes of both FIG. 9A and FIG. 9B above are carried out in the high availability state.

Further, S6 of FIG. 9A is the process for applying a journal recorded in a JVOL 43J to an IVOL 43I in accordance with a write request from an application 47, and is processing generated as a result of an application write request. Conversely, S16 of FIG. 9B is a process for applying a checkpoint recorded in a JVOL 43J to an IVOL 43I in accordance with the backup management program 45 (or an application 47), and is processing generated as a result of staticizing an application 47. Furthermore, since the above-mentioned S6 and S16 are carried out at independent timings, there is no need to utilize a checkpoint in step S6 of FIG. 9A.

Incidentally, the transition from the normal state to the high availability state is carried out because of an increase in access frequency, but, by contrast, the state can also return from the high availability state to the normal state due to decreased access frequency. An example of the flow of processing carried out at this time will be explained below by referring to FIGS. 10 and 11.

When S40 of FIG. 5 is finished, the backup management program 45 determines the "backup mode" of a certain application 47 by referencing the backup setting table 53 (S81).

If the result of S81 is that the determined "backup mode" is "journal backup" S81: NO), the backup management program 45 acquires from the backup setting table 53 the "allowable access frequency" of this application 47 (S82). Further, the backup management program 45 acquires the "backup start time" and "backup end time" of this application 47 from the backup management table 55, and calculates the length of time for backup execution, which is the difference of these times (S83). Then, the backup management program 45 acquires an average value for the frequency of accesses during this backup execution time using the same method as that of S55 of FIG. 7 (S84).

The backup management program 45 compares the acquired average access frequency value with the "allowable access frequency" (S85), and when the acquired average access frequency value is greater than the "allowable access frequency" (S85: NO), it terminates processing.

Conversely, when the acquired average access frequency value is smaller than the "allowable access frequency" (S85: YES), the backup management program 45 requests the storage management program 49 to cancel allocation of the JVOL 43J (S86). In this case, the processing of FIG. 11 is carried out.

That is, the storage management program 49 acquires the "allocated" "volume ID" corresponding to the targeted application 47 (S91), and issues a request to the control program 41 so that this "volume ID" is not set as the JVOL 43J for the application 47 being targeted (S92). By so doing, this JVOL 43J ceases to exist as a JVOL 43J in the storage system 21. The storage management program 49 updates the "volume ID" acquired in S91 to "not allocated" (S93), and sets a "–" in the "target application" column of the application 47 being targeted (In other words, deletes the application name that was written.) (S94). Thereafter, the storage management program 49 can notify the backup management program 45 that journal volume allocation has been canceled (S95).

Refer to FIG. 10 once again. The backup management program 45, which received the journal volume cancellation notification, sets the "backup mode" of the backup setting table 53 to "snapshot backup" (S87). Further, the backup management program 45 requests the control program 41 not to write a journal to the logical volume 43 for which allocation was cancelled (S88). Further, the backup management program 45 deletes both the "journal volume ID" of the JVOL 43J for which allocation was cancelled, and the "journal application volume ID" corresponding thereto from the backup management table 55 (S89).

Figure 10:
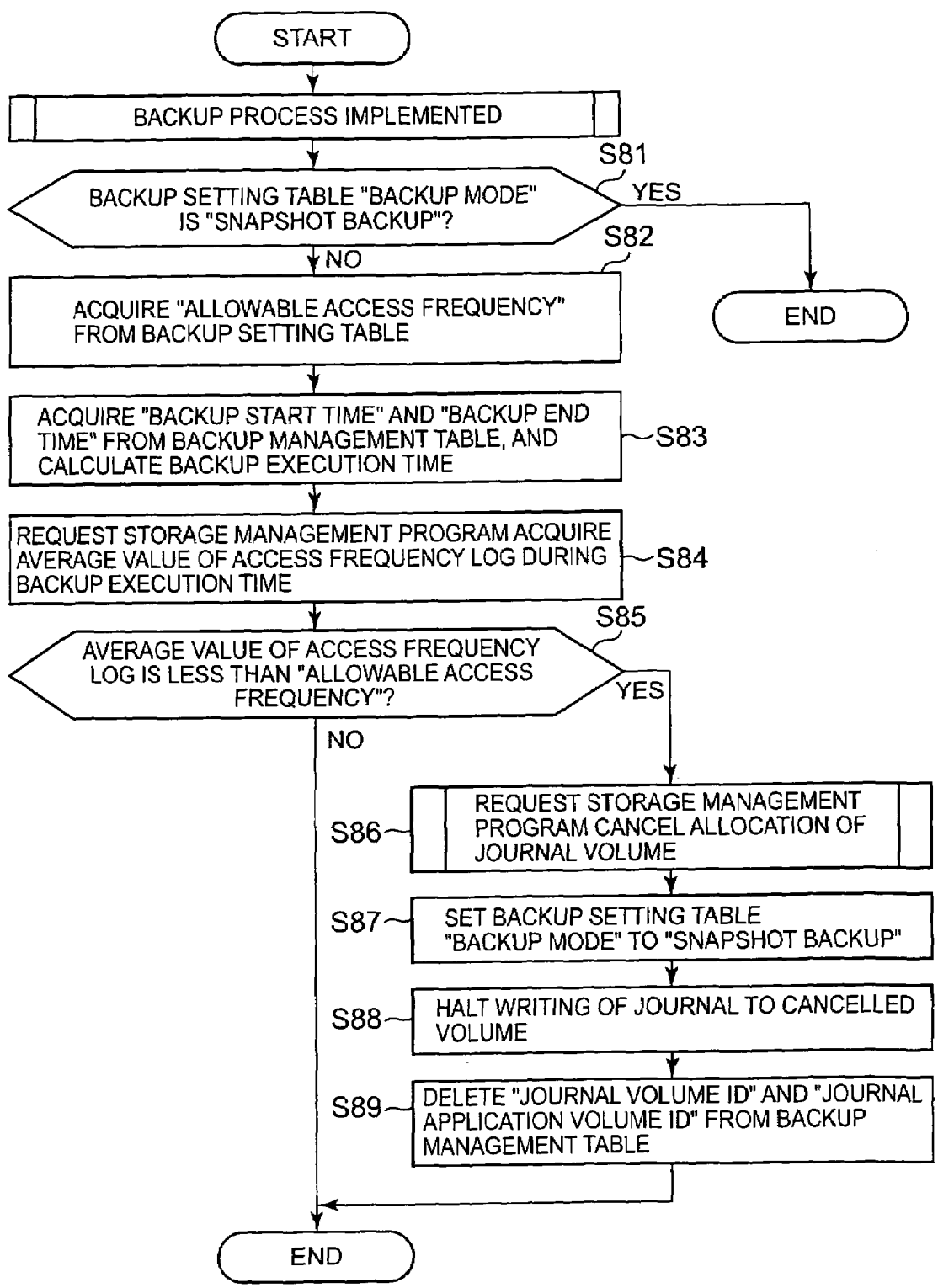
FIG. 10 shows an example of a processing flow performed when transitioning from a high availability state to the normal state.
Figure 11:
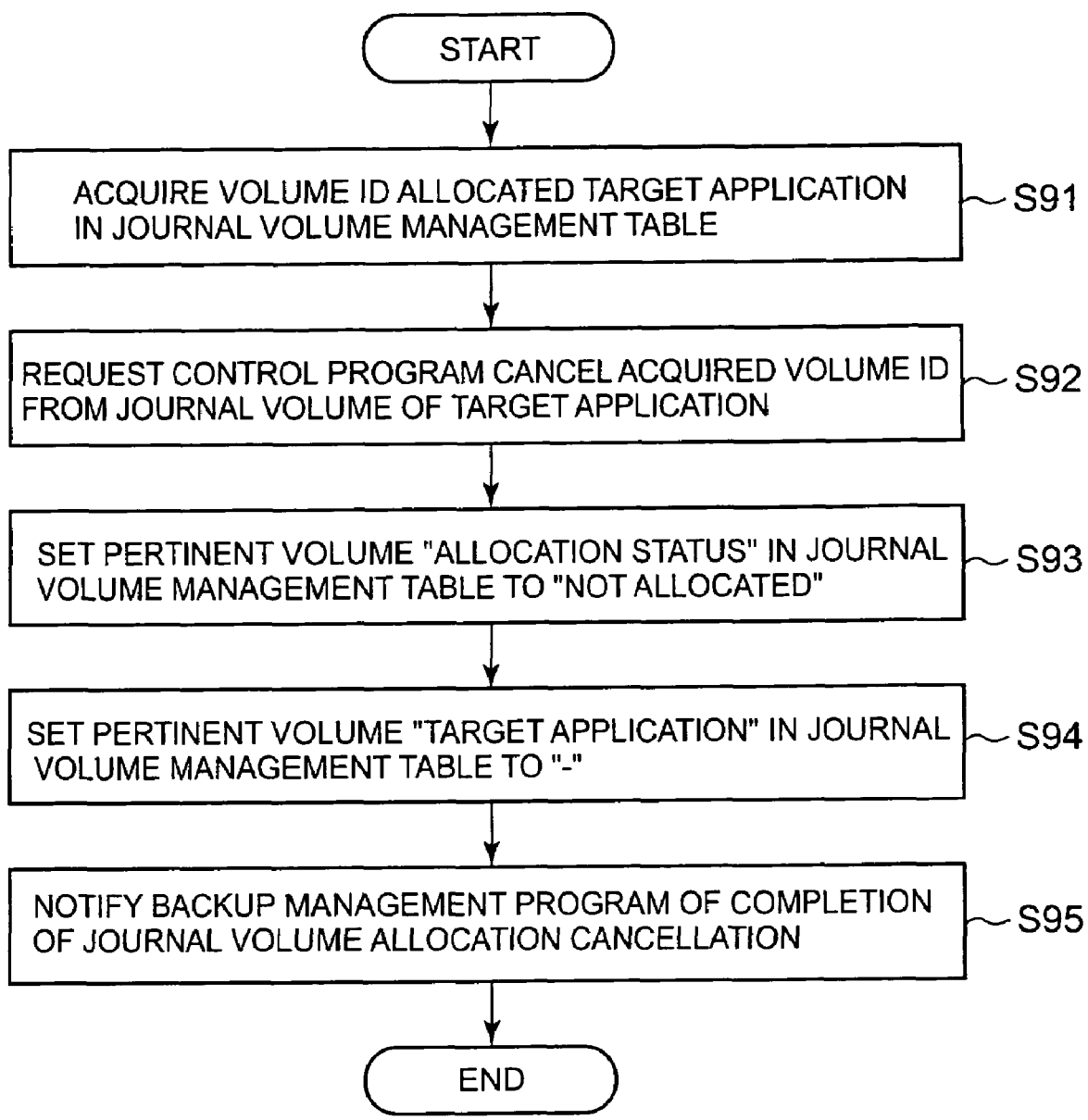
FIG. 11 shows an example the flow of journal volume allocation cancellation processing.

By carrying out the processing flow disclosed in the above-mentioned FIGS. 10 and 11, the state transitions from the high availability state to the normal state.

Now then, in this embodiment, as disclosed in FIG. 2D, for example, the setting is made such that journal-based restoration can be carried out for application B in preparation for the destruction of logical data. This is accomplished by the storage management program 49 allocating a specified JVOL 43J ID and IVOL 43I ID for the application B prior to the commencement of operation of the overall system disclosed in FIGS. 1A and 1B. Furthermore, the JVOL 43J ID and IVOL 43I ID mentioned here are the same types as those recorded in the backup management table 55, and the backup management program 45 manages these IDs in the journal management table 57, which is a different table than the backup management table 55. A snapshot for journal application is written to an IVOL 43I, and a journal is recorded in a JVOL 43J every time a PVOL 43P is updated.

Figure 12:
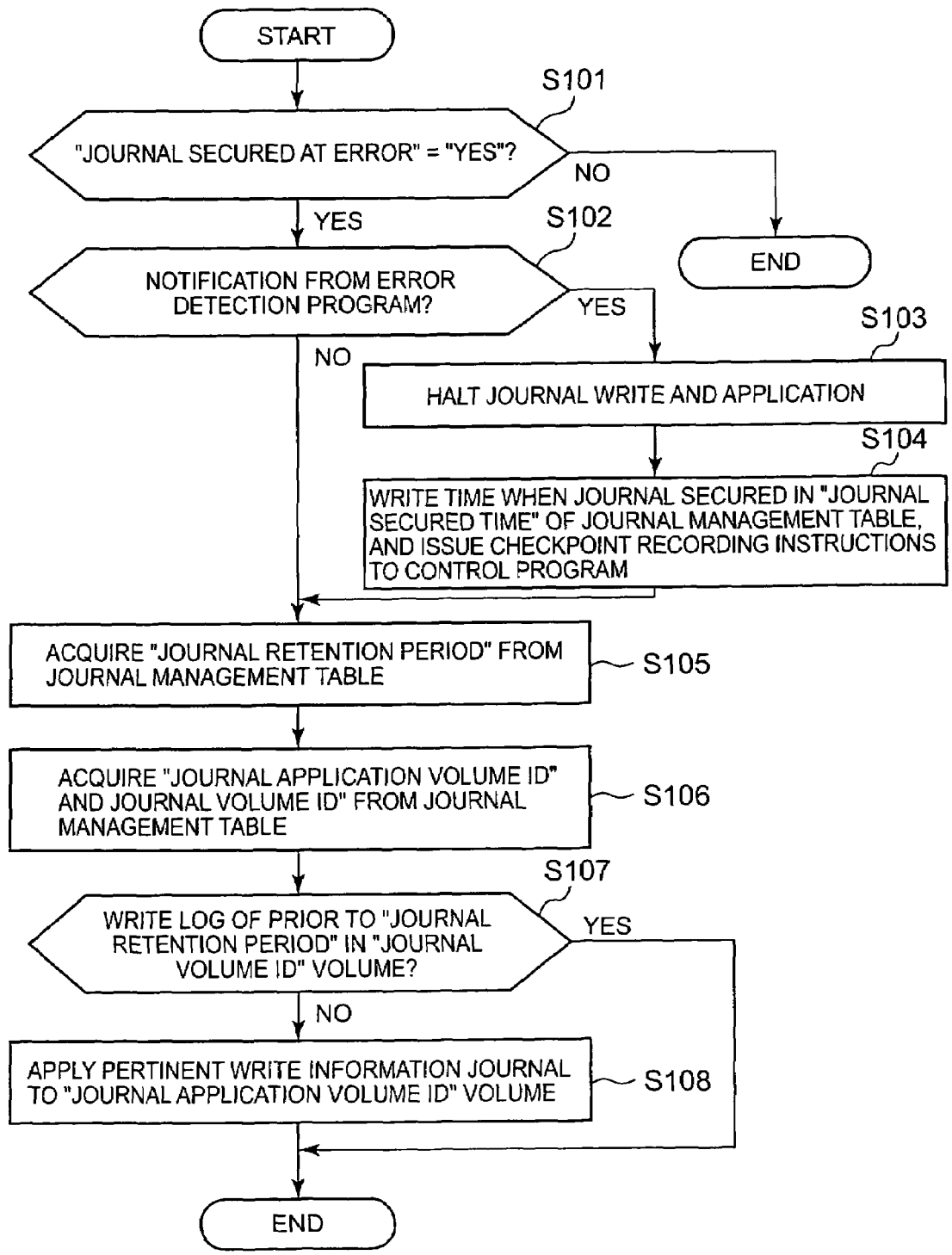
FIG. 12 shows an example of the flow of processing performed for securing a journal when an error occurs in an application.
Figure 13B:
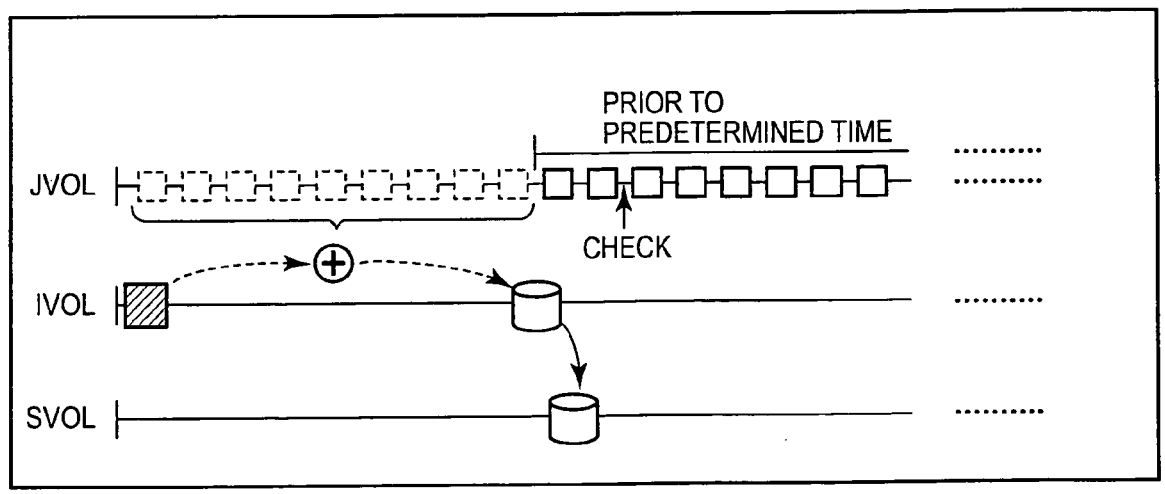
FIG. 13B is a diagram illustrating a backup when an error occurs.

In a situation such as this, processing for securing a journal is carried out when an error occurs in application B. An example of this processing flow will be explained below by referring to FIGS. 12 and 13B. (FIG. 13B is a schematic showing an overview of a backup when an error occurs.)

When the "journal secured at error detection" field of the journal management table 57 shows "Yes" (S101: YES), and an error detected notification is received from the error detection program 44 (S102: YES), the backup management program 45 issues a request to the control program 41 to halt the writing of a journal to a JVOL 43J corresponding to the application B, which corresponds to the above-mentioned "Yes", and the application of the journal to an IVOL 43I (S103). More specifically, for example, the backup management program 45 issues a request to the control program 41 to stop recording a journal comprising a "journal volume ID" and a "journal application volume ID" corresponding to application B. The control program 41 responds to this request, and thereafter does not record a journal or apply a journal even if a PVOL 43P is updated, until it receives a command to cancel stoppage. The backup management program 45, for example, when the processing flow of this FIG. 12 is finished, can restart the writing and application of a journal by issuing the above-mentioned stoppage cancellation command to the control program 41.

In accordance with the processing of this S103, the backup management program 45 can secure, as list data, a snapshot solely for the "journal retention period" (the period a journal is recorded in the journal management table 57) prior to the point in time of error detection, and a journal of up to the point in time when an error is detected.

At this time, the backup management program 45 also instructs the control program 41 to record the time that S103 was carried out (in other words, the time at which restoration data was secured) in the "journal secured time" field of the journal management table, and to record the checkpoint representing this time (S104). By so doing, a checkpoint representing the point in time at which a journal was secured at error generation is recorded in a JVOL 43J by the control program 41.

Subsequent to either a NO in S102, or to S104, the backup management program 45 acquires from the journal management table 57 the "journal retention period", "journal application volume ID" and "journal volume ID" (S105, S106). Then, the backup management program 45 makes a determination, based on the above-mentioned journal secured time in the JVOL 43J corresponding to the "journal volume ID", whether or not a journal exists prior to the "journal retention period" (S107). If the result is that a journal does exist (S107: YES), the backup management program 45 requests the control program 41 to apply the journal of prior to the "journal retention period" to the IVOL 43I corresponding to the "journal application volume ID" (S108). In accordance with S108, as shown in FIG. 13B, the journal of prior to the "journal retention period" is applied to an IVOL 43I by the control program 41. That is, a snapshot from the above-mentioned journal secured time until prior to the "journal retention period" is generated in the IVOL 43I.

Furthermore, every time the control program 41 applies a journal to an IVOL 43I here, it can delete this applied journal from the JVOL 43J. (the present invention can also be constituted such that the applied journal is not deleted immediately after being applied, but rather is deleted when the unused capacity of the JVOL 43J becomes insufficient.)

A restoration using a journal, for example, can be carried out using the processing flow disclosed in FIG. 6. This processing flow will be explained below by referring to FIG. 6.

For example, the backup management program 45 queries the control program 41 for a checkpoint, and the control program 41 responds to this query by specifying the most recent checkpoint in the JVOL 43J (the checkpoint nearest the current time), and replying to the backup management program 45 with the respective times corresponding to the respective journals in the specified checkpoint. The backup management program 45 displays all the replied times on a not-shown display device in a user selectable mode. In other words, a Recovery Point Object (RPO), which a user can select, is displayed here.

When a journal-based restoration, RPO, and application 47 to be targeted for restoration are specified (S41: YES), the backup management program 45 acquires from the journal management table 57 the "journal application volume ID" of the specified application 47, and issues journal restoration instructions comprising the acquired ID to the control program 41 (S45). By so doing, the control program 41 can acquire a snapshot from the IVOL 43I corresponding to the notified ID (S46). Further, the backup management program 45 can acquire the "journal volume ID" of the specified application 47 from the journal management table 57, and notify this ID and the specified RPO to the control program 41 (S47).

Accordingly, the control program 41 successively applies the data in the respective journals up to the specified RPO to the snapshot acquired in S46 (S48). As a result of this, the snapshot of the PVOL 43P in a user-specified RPO is restored. Furthermore, in S48, each time the control program 41 updates a snapshot by applying the data in the respective journals to the above-mentioned snapshot, it can query the user via the backup management program 45 as to whether or not the updated snapshot is okay.

According to the embodiment explained hereinabove, as a rule, snapshot backup is carried out, but when data write access frequency increases, the system switches over to journal backup. In journal backup, each time a PVOL 43P is updated, a journal is written to a JVOL 43J, and at backup, the checkpoint at that point in time can be written only to the JVOL 43J, and the backup window can substantially be set to zero. Further, in a journal backup, at a predetermined timing (for example, when the mode is switched from snapshot backup to journal backup), a snapshot of a PVOL 43P at that point in time (an initial snapshot) is written to an IVOL 43I, and, in the background, the data in a journal in a JVOL 43J is reflected in the snapshot in the IVOL 43I. By so doing, the availability of the application can be maintained. If the applied journal is deleted from the JVOL 43J at a predetermined timing, it also becomes possible to cut down on the used capacity of the JVOL 43J.

Further, in accordance with the above-mentioned embodiment, when an application 47 error is detected, a checkpoint of the point in time at which this error is detected is recorded in a JVOL 43J. That is, a consistent journal is secured by the application 47. By utilizing the secured journal and snapshot in an IVOL 43I, it is possible to restore the data at the point in time at which the error is detected.

The preceding has explained the preferred embodiment of the present invention, but this is an example used to explain the present invention, and does not purport to limit the scope of the present invention solely to this embodiment. The present invention can also be implemented in a variety of other aspects.

For example, in S71 of FIG. 8, the ID of a JVOL 43J of either a capacity or number corresponding to an access frequency can be acquired. That is, the higher the access frequency, either the larger the capacity or the greater the number of logical volumes 43 can be allocated as JVOL 43J.

Further, for example, detected error information is not necessarily limited to that which is outputted from an application 47. More specifically, for example, the error detection program 44 can detect whether or not an error has occurred in an application 47 by referencing information, which a not shown OS (operating system) manages in a business server 1 provided with the error detection program 44.

Further, for example, in S41 of FIG. 6, all the checkpoints in the JVOL 43J are selectably displayed, and when a certain checkpoint is selected, processing for restoring the data of the point in time of this selected checkpoint can be carried out.

Further, for example, the control program 41 can write in a mode such that the checkpoint written in S38 of FIG. 5 (hereinafter the first checkpoint) and the checkpoint written in S104 of FIG. 12 (hereinafter the second checkpoint) can be distinguished from one another. In this case, the backup management program 45 can either selectably display the first checkpoint and the second checkpoint so that a user can distinguish between the two, or it can selectably display either the first or second checkpoint, and not display the other.

Further, for example, a plurality of generations of snapshots for the same application 47 can be managed in either one or a plurality of IVOL 43I. In this case, for example, if an RPO specification is received when executing restoration, a snapshot of the point in time nearest to this RPO can be acquired, and a journal can be applied to this snapshot. In other words, it should be possible to shorten the time required for restoration.

Further, for example, the backup management program 45 does not have to make the user select whether restoration will be carried out using a snapshot or a journal. More specifically, for example, when the backup management program 45 receives restoration instructions from a user, it can decide whether to carry out S42 through S44, or S45 through S48 of FIG. 6 in accordance with which of the above-mentioned four types of states (that is, the normal state, high availability state, etc.) is the current state.

Further, for example, an IVOL 43I can also be selected and allocated from among a plurality of candidates the same as a JVOL 43J, either in place of or in addition to a JVOL 43J. Furthermore, as for the JVOL 43J, in accordance with the addition and/or deletion of a journal (that is, the increase or decrease in the total number of journals in the journal group), either an not-allocated volume can be taken as a new JVOL 43J, or a volume that was allocated as a JVOL 43J can be taken as not having been allocated, but this need not be done for an IVOL 43I. This is because the appropriate data is overwritten in a snapshot acquired by an IVOL 43I, so that the size of this snapshot itself does not fluctuate.

Further, for example, management can also be carried out for each business server 1, either in place of or in addition to the management of each application 47. More specifically, for example, in the tables of FIGS. 2A through 2D, and FIGS. 3A and 3B, the "backup object" and "target application" can be the IDs of a business server 1.

What is claimed is:

1. A storage control method, which is realized in a system comprising a logical volume, and an access request source for the logical volume, the storage control method comprising the steps of:

updating a first logical volume each time a write request is issued from the access request source, by writing data contained in the issued write request to said first logical volume;

transitioning to a snapshot mode;

monitoring the state related to securing the length of time for backup execution, and when it comes to a state where securing the length of time for backup is more difficult than a certain state due to a reduced backup window, which is the length of time during which the access request source can be halted or staticized, transitioning to a journal mode in place of the snapshot mode;

when in said snapshot mode, acquiring, either at regular or irregular intervals, a snapshot of said first logical volume for a second logical volume at the point in time of backup execution, and taking the snapshot in said second logical volume as restoration data when executing restoration; and when in said journal mode, writing a journal which is a write log comprising the data in said write request, to a third logical volume each time said write request is issued, and acquiring a backup, to which the data in the journal written to said third logical volume is applied when executing restoration.

2. The storage control method according to claim 1, further comprising the steps of:

determining the frequency at which write requests are issued to said first logical volume, and comparing the determined issuing frequency with a certain frequency threshold, as a way of monitoring the state related to securing said length of time for backup execution; and recognizing that securing the length of time for backup becomes more difficult than said certain state when said issuing frequency exceeds said certain frequency threshold.

3. The storage control method according to claim 2, wherein, when said issuing frequency is said certain frequency threshold or less, the system transitions to the original snapshot mode in place of said journal mode.

4. The storage control method according to claim 1, further comprising the steps of:

calculating the length of time for backup execution using a prescribed method, and comparing the calculated length of time for backup execution with a certain length-of-time threshold value, as a way of monitoring the state related to securing said length of time for backup execution; and recognizing that securing the length of time for backup becomes more difficult than said certain state when the calculated length of time for backup execution exceeds a predetermined length of time.

5. The storage control method according to claim 1, which, when in said journal mode, comprises the steps of:

acquiring a snapshot of said first logical volume, at the point in time of a predetermined timing, for a fourth logical volume;

acquiring an updated snapshot by applying, either at regular or irregular intervals, the data in the journal in said third logical volume to the snapshot in said fourth logical volume;

generating the updated snapshot in said second logical volume; and taking the snapshot generated in said second logical volume as restoration data when executing restoration.

6. The storage control method according to claim 5, which, when in said snapshot mode, further comprises the steps of:

staticizing said access request source so that a write request is not issued from said access request source; and acquiring, subsequent to this staticization, the snapshot of said first logical volume for said second logical volume, and when in said journal mode, further comprises the steps of:

acquiring the snapshot of said first logical volume for said fourth logical volume without staticizing said access request source.

7. The storage control method according to claim 1, which, when in said journal mode, further comprises the steps of:

writing in a predetermined storage area a checkpoint, which is data representing a point in time, in at least one of the point in time of a backup, or the point in time when an error is detected; and acquiring a backup in which the data in a journal of up to the point in time represented by said checkpoint is applied when executing restoration.

8. The storage control method according to claim 1, which, when in at least one of said snapshot mode or said journal mode, comprises the steps of:

securing the journal in said third logical volume by performing control so that the journal is not added in said third logical volume at the point in time at which an error is detected; and acquiring a backup in which the data in a journal of up to a predetermined time prior to this point in time is applied.

9. The storage control method according to claim 1, wherein at least a plurality of second logical volumes are provided and the storage control method comprises the steps of:

recording whether or not a journal is to be secured at the point in time at which an error is detected, in a different table than a table, which records that to which of the second logical volumes a backup in which the data in said journal is applied is to be applied.

10. The storage control method according to claim 1, further comprising the steps of:

selecting a logical volume from among a plurality of logical volume candidates; and taking the selected logical volume as said third logical volume.

11. The storage control method according to claim 10, further comprising the steps of:

making either the capacity or number of said selected logical volume either a capacity or number which accords with the state related to securing the length of time of backup execution.

12. A computer, which is capable of communicating with a storage system comprising a logical volume, wherein said computer:

issues a write request for a first logical volume to said storage system; transitions to a snapshot mode;

monitors the state related to securing the length of time for backup execution, and when it comes to a state where securing the length of time for backup is more difficult than a certain state due to a reduced backup window, which is the length of time during which it is possible for the access request source to be halted or staticized, transitions to the journal mode in place of said snapshot mode;

when in said snapshot mode, requests said storage system to acquire, either at regular or irregular intervals, a snapshot of said first logical volume at the point in time at which backup is executed, and takes the snapshot in a second logical volume, which corresponds to said first logical volume, as the restoration data when executing restoration; and when in said journal mode, requests said storage system to commence recording a journal, which is a write log comprising the data in said write request.

13. A computer program capable of being read and executed by a processor provided in a computer, which is capable of communicating with a storage system comprising a logical volume, wherein said computer program:

transitions to a snapshot mode;

monitors the state related to securing the length of time for backup execution, and when it comes to a state where securing the length of time for backup is more difficult than a certain state due to a reduced backup window, which is the length of time during which it is possible for the access request source to be halted or staticized, transitions to the journal mode in place of said snapshot mode;

when in said snapshot mode, requests said storage system to acquire, either at regular or irregular intervals, a snapshot of said first logical volume at the point in time at which backup is executed, and takes the snapshot in a second logical volume, which corresponds to said first logical volume, as the restoration data when executing restoration; and when in said journal mode, requests said storage system to commence recording a journal, which is a write log comprising the data in said write request.

14. A storage control method, which is realized in a system comprising a logical volume, and an access request source for the logical volume, the storage control method comprising the steps of:

updating a first logical volume each time a write request is issued from the access request source, by writing data contained in the issued write request to said first logical volume;

transitioning to a snapshot mode;

monitoring the state related to securing the length of time for backup execution, and when it comes to a state where securing the length of time for backup is more difficult than a certain state due to a reduced backup window, which is the length of time during which the access request source can be halted or staticized, transitioning to a journal mode in place of the snapshot mode;

when in said snapshot mode, staticizing, either at regular or irregular intervals, said access request source so that a write request is not issued from said access request source when executing backup, and acquiring, subsequent to this staticization, a snapshot of said first logical volume at this point in time for a second logical volume, and taking the snapshot in said second logical volume as restoration data when executing restoration;

when in said journal mode, acquiring, at a predetermined timing, the snapshot of said first logical volume at this point in time for a fourth logical volume without staticizing said access request source, and, based on this snapshot, writing, each time said write request is issued, a journal which is a write log comprising the data in said write request to a third logical volume, writing in a prescribed storage area a checkpoint which is data representing a point in time in at least one of the point in time of a backup, or the point in time at which an error is detected, and acquiring an updated snapshot by applying, either at regular or irregular intervals, the data in a journal of up to the point in time represented by said checkpoint, to the snapshot in said fourth logical volume;

carrying out, as a way of monitoring the state related to securing said length of time for backup execution, at least one of the processes of determining the frequency at which write requests are issued to said first logical volume, and comparing the determined issuing frequency with a certain frequency threshold, or calculating the length of time for backup execution from the backup start time and end time, respectively, and comparing the calculated length of time for backup execution with a certain length-of-time threshold value;

recognizing that securing the length of time for backup becomes more difficult than said certain state, either when said issuing frequency exceeds said certain frequency threshold value, or when the calculated length of time for backup execution exceeds a predetermined length of time; and transitioning to the original snapshot mode in place of said journal mode when said issuing frequency is said certain frequency threshold value or less.

* * * * *